(12) United States Patent
Mikami

(10) Patent No.: US 6,185,375 B1
(45) Date of Patent: Feb. 6, 2001

(54) FINDER MECHANISM AND DRIVE MECHANISM FOR USE IN CAMERA

(75) Inventor: Kazuo Mikami, Tokorozawa (JP)

(73) Assignee: Olympus Optical Co., Ltd. (JP)

(*) Notice: Under 35 U.S.C. 154(b), the term of this patent shall be extended for 0 days.

(21) Appl. No.: 09/239,386

(22) Filed: Jan. 28, 1999

(30) Foreign Application Priority Data

Jan. 28, 1998 (JP) .................................. 10-016185

(51) Int. Cl.[7] .......................... G03B 17/00; G03B 15/03; G03B 13/10
(52) U.S. Cl. .......................... 396/84; 396/175; 396/177; 396/379
(58) Field of Search .............................. 396/84, 378, 379, 396/175, 176, 177, 61, 62

(56) References Cited

U.S. PATENT DOCUMENTS

| | | | |
|---|---|---|---|
| 4,945,372 | * | 7/1990 | Higuchi et al. ........................ 396/61 |
| 4,951,074 | * | 8/1990 | Ueda ........................................ 396/62 |
| 5,539,490 | * | 7/1996 | Kang et al. ........................... 396/348 |
| 5,734,931 | * | 3/1998 | Inoue et al. ............................ 396/52 |
| 5,790,908 | * | 8/1998 | Matsuda ................................ 396/379 |
| 5,832,317 | * | 11/1998 | Shimizu ................................ 396/83 |

FOREIGN PATENT DOCUMENTS 8313975   11/1996   (JP) .

* cited by examiner

*Primary Examiner*—Eddie C. Lee
(74) *Attorney, Agent, or Firm*—Ostrolenk, Faber, Gerb & Soffen, LLP

(57) ABSTRACT

A zoom lens barrel in a camera is driven by a drive motor via a zoom drive gear train and a lens barrel gear train. A finder optical system, which is interlocked with the zoom lens barrel, is driven by the drive motor through the zoom drive gear train, a finder drive gear train, a friction clutch mechanism and a finder cam. Since the finder optical system is driven via the friction clutch mechanism, a phase adjustment between the lens barrel and the finder optical system is easily performed. The camera is easily assembled without paying particular attention to zoom position deviation in the finder optical system.

39 Claims, 14 Drawing Sheets

FINDER MECHANISM AND DRIVE MECHANISM FOR USE IN CAMERA

BACKGROUND OF THE INVENTION

1. Field of the Invention

The present invention relates to a finder mechanism and a drive mechanism, for use in a camera, which are projected and retracted in step with an imaging optical system.

2. Related Art Statement

A mechanism for driving a camera view finder is disclosed in Japanese Unexamined Patent Publication No. 8-313975. With a lens barrel interlocked with a view finder cam, the view finder drive mechanism projects and retracts a view finder optical system in step with the lens barrel that is projected, retracted and rotated. The view finder drive mechanism helps the make camera compact.

The camera with the above view finder drive mechanism includes an imaging lens barrel that is rotatable about an optical axis and movable between a projected position and a retracted position, a view finder having a lens movable along the optical axis, and a long gear and cam shaft for transferring the rotation of the lens barrel to the movable lens during the projection and retraction of the lens barrel. By means of the long gear and cam shaft, the rotary force of the lens barrel is transferred to the movable lens of the view finder to vary the magnification of the movable lens.

In the finder drive mechanism disclosed in Japanese Unexamined Patent Publication No. 8-313975, the lens barrel and the view finder cam are adjusted in phase with one another during assembly. This necessitates additional manufacturing steps, thereby increasing manufacturing costs. If an error occurs in an assembly process, disassembly and a reassembly of the camera will be required.

Disassembly and reassembly of the camera are also required when gears in a drive power transfer system in the view finder drive deviate as a result of gear tooth slippage.

The same problem is encountered not only in the view finder drive mechanism but also in a pop-up flash unit. As a unit driven together with the lens barrel, the pop-up flash unit is projected to its flashing position (pop-up position) from its retracted position in a camera body when the imaging lens is projected from its photograph-disable position (retracted position) to its photograph-enable position.

SUMMARY OF THE INVENTION

The present invention provides a camera view finder mechanism which is easily assembled and aligned in relative position without paying particular attention to a zoom position deviation in a view finder optical system during an assembly process or when deviations takes place. The present invention also provides a camera drive mechanism, other than the camera optical finder mechanism, which is easily assembled and aligned in relative position without paying particular attention to a relative position deviation from an imaging lens position during an assembly process or when the deviation takes place.

In one aspect, the camera finder mechanism of the present invention includes a view finder optical system having a plurality of lenses, a drive source for generating driving power, and drive power transfer mechanism including a clutch, for transferring the driving power from the drive source to the finder optical system via the clutch The drive source drives the drive power transfer mechanism, causing the view finder optical system to be projected and retracted via the clutch.

In another aspect, the camera drive mechanism of the present invention includes a lens barrel that is projected and retracted in the direction of an optical axis, a movable member that moves in response to the state of the lens barrel, a drive source for driving the lens barrel and the movable member, drive power transfer mechanism for transferring driving power from the drive source to the lens barrel and the movable member, clutch arranged on the drive power transfer means. The drive source drives the drive power transfer mechanism, causing the view finder optical system to be projected and retracted via the clutch.

In accordance with one aspect of the invention, the invention comprises: a zoom lens whose focal length is variable and is adjustable between a telephoto and a wide angle position, said zoom lens including at least a pair of moveable lenses which move relative to one another to adjust said focal length of said zoom lens; a zoom view finder whose focal length is adjustable between a telephoto and a wide angle position, said zoom view finder including at least a pair of moveable lenses which move relative to one another to adjust said focal length of said zoom view view finder; a source of motive force; a transmission which applies said motive force to said zoom lens and said zoom view view finder so that said focal lengths of said zoom view view finder and said zoom lens will normally be adjusted in unison, but which permits said focal length of one of said zoom lens and said zoom view view finder to be adjusted independently of said focal length of the other of said zoom lens and said zoom view view finder.

In the preferred embodiment, the focal length and the zoom lens and the zoom view view finder may be adjusted independently of the focal length of the other of the zoom lens and the zoom view view finder when one of the zoom lens and zoom view finder reaches its telephoto or wide angle position before the other of said zoom lens and said zoom view view finder reaches its telephoto or wide angle position.

The present invention is also directed towards a process for adjusting the focal alignment of a zoom lens and a zoom view finder, said a zoom lens having a focal length which is variable between a telephoto and a wide angle position, said zoom lens including at least a pair of moveable lenses which move relative to one another, said zoom view finder having a focal length which is adjustable between a telephoto and a wide angle position, said zoom view finder including at least a pair of moveable lenses which move relative to one another, said focal lengths of said zoom lens and said zoom view finder normally being adjusted in unison but, due to the presence of a clutch in the gear train applying power to at least one of said zoom lens and zoom view view finder, may have its focal length adjusted independently of one another, said process comprising the acts of: moving said zoom lens into one of its telephoto and wide-angle positions and, while said zoom lens is in said one of its positions, moving said zoom view view finder into its corresponding telephoto and wide-angle positions.

The invention also is directed towards a process for adjusting the alignment of the respective focal lengths of a zoom lens and a zoom view view finder which are normally adjusted in unison but, due to the presence of a clutch in the gear train applying power to at least one of said zoom lens and zoom view view finder, may be adjusted independently of one another, said zoom lens and said telephoto lenses each being movable between a telephoto and a wide-angle position, said process comprising the acts of: initially placing said zoom lens and said zoom view view finder in a camera with said focal lengths of said zoom lens and said zoom view view finder being misaligned, moving said zoom lens into one of its telephoto and wide-angle positions and, while said zoom lens is in said position, and moving said zoom view view finder into its corresponding telephoto or wide-angle position.

DETAILED DESCRIPTION OF THE PREFERRED EMBODIMENTS

Figure 1:
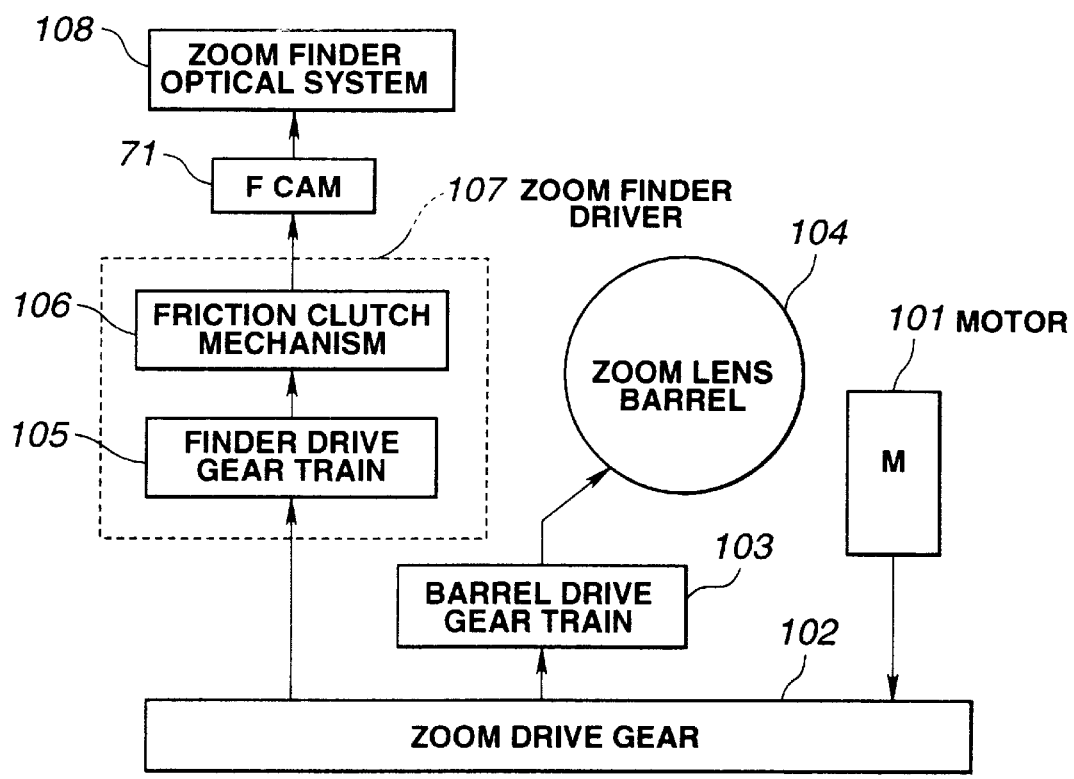
FIG. 1 is a block diagram showing the camera that incorporates a camera view finder mechanism of a first embodiment of the present invention.

Referring to the drawings, the embodiments of the present invention are now discussed.

FIG. 1 is a block diagram showing the camera that incorporates a camera view finder mechanism of a first embodiment of the present invention.

The camera generally includes generally an imaging optical system, a view finder optical system and their drive mechanisms. Specifically, the camera includes a zoom lens barrel 104 having the zoom imaging optical system. A zoom finder optical system 108 moves in step with the zoom lens barrel 104. A drive motor 101 which rotates individually the zoom view lens barrel 104 and the zoom finder optical system 108 in a predetermined direction for zoom-in and zoom-out actions, while working also as a drive source for film advance and imaging and view finder optical system driving. A first drive power transfer mechanism includes a zoom drive gear train 102 for transferring the rotational energy of the drive motor 101 to a barrel drive gear train 103 at a reduced speed, and the barrel drive gear train 103 for transferring the drive power of the zoom drive gear train 102 to the zoom lens barrel 104. A and second drive power transfer mechanism includes a zoom view finder drive 107 having a view finder drive gear train 105 and a friction clutch mechanism 106. A view finder cam (hereinafter referred to as F cam) 71 (see FIG. 3) drives the zoom view finder optical system 108 for projection and retraction actions.

Figure 2:
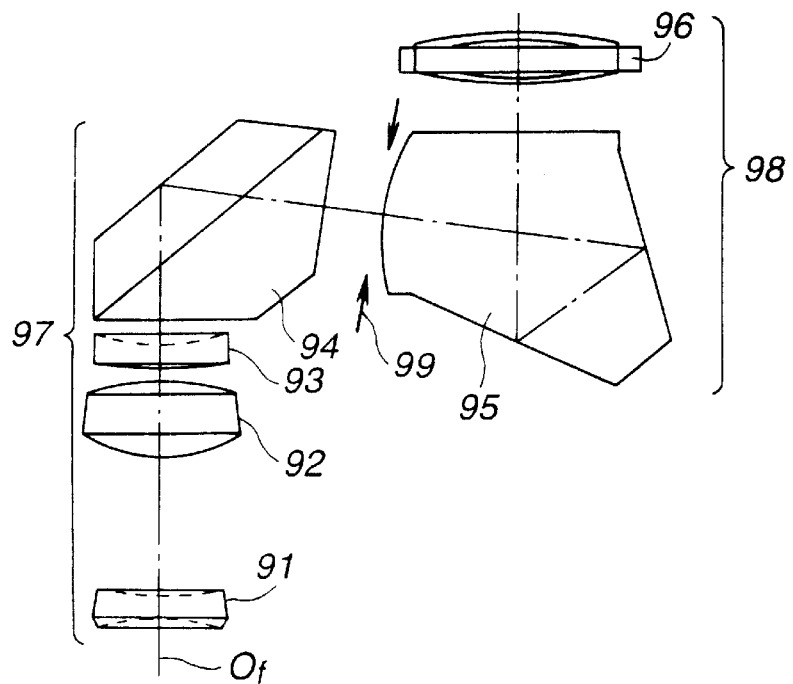
FIG. 2 is a view schematic diagram showing a finder optical system of the camera of the first embodiment.

The zoom view finder optical system 108, which is a real image view finder as shown in FIG. 2, includes an objective lens unit 97 composed of a first lens 91, a second lens 92, a third lens 93, and a roof prism 94, and an eyepiece lens unit 98 composed of a penta prism 95 and an eyepiece lens 96. The zoom view finder optical system 108 offers a predetermined angle of field by making the first lens 91 and second lens 92 move forward and recede in the direction of the optical axis.

The third lens 93 is affixed onto the body of the view finder (hereinafter referred to as F body) 76 (see FIG. 3), and guides a light ray coming in through the first lens 91 and second lens 92 to the roof prism 94.

The roof prism 94 is affixed to the F body 76, and reflects the light ray coming in through the third lens 93 to the penta prism 95. The objective lens unit 97, composed of the first lens 91, second lens 92, third lens 93, and roof prism 94, in the zoom view finder optical system focuses an image on an image plane 99.

The penta prism 95, affixed onto the F body 76, reflects the image twice. The image is focused by the objective lens unit 97 toward the eyepiece lens 96. The eyepiece lens 96 is supported by the F body 76 so that the eyepiece lens 96 focuses on the image formed on the image plane 99.

Figure 3:
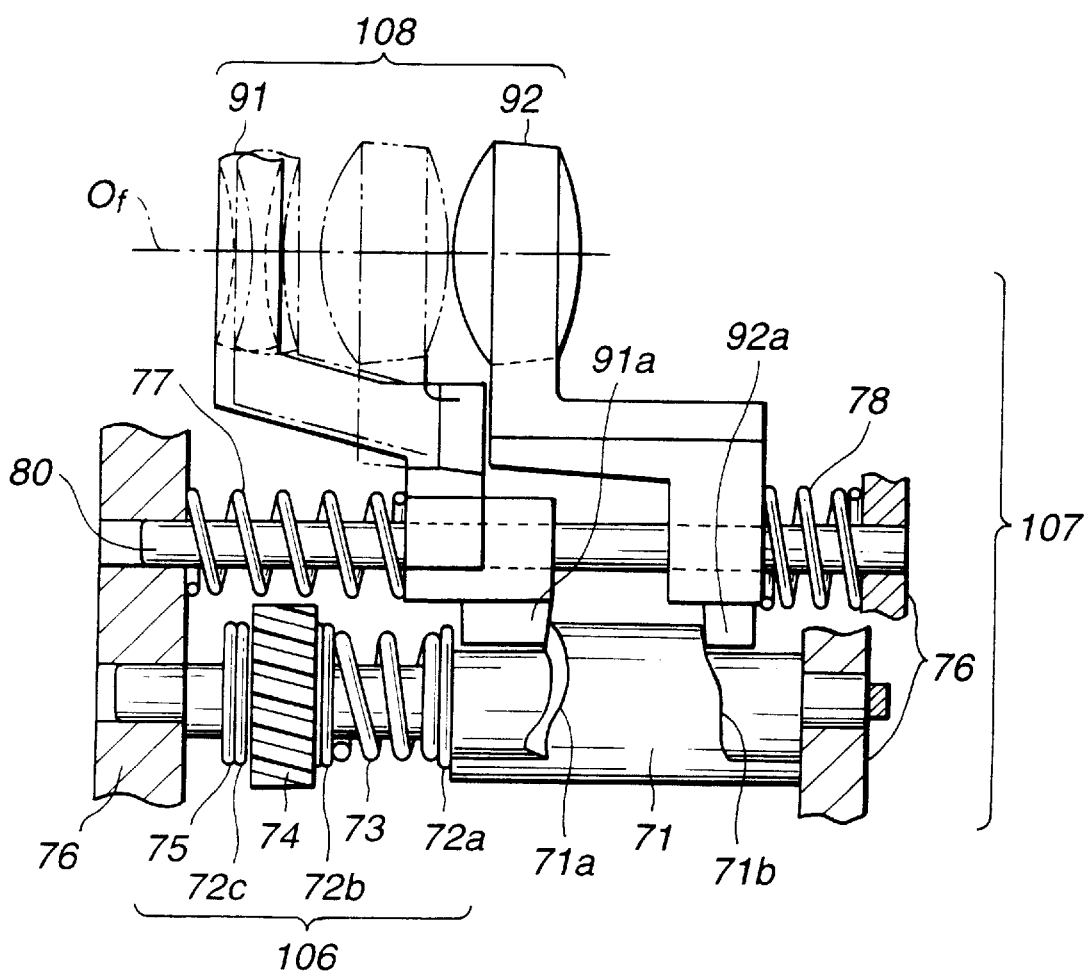
FIG. 3 is a vertical sectional view showing a zoom finder drive mechanism of the camera of the first embodiment.
Figure 4:
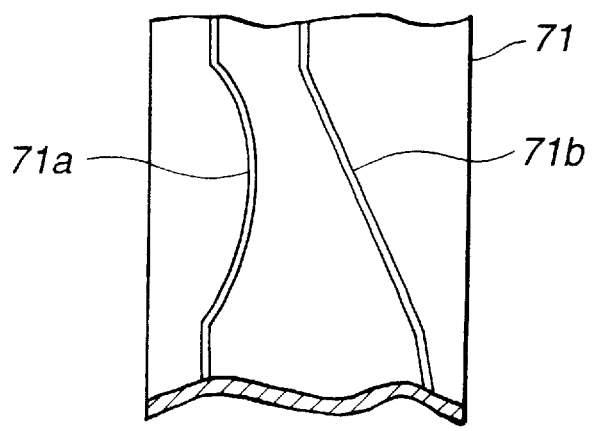
FIG. 4 is a view development of a finder cam of the camera of the first embodiment.
Figure 5:
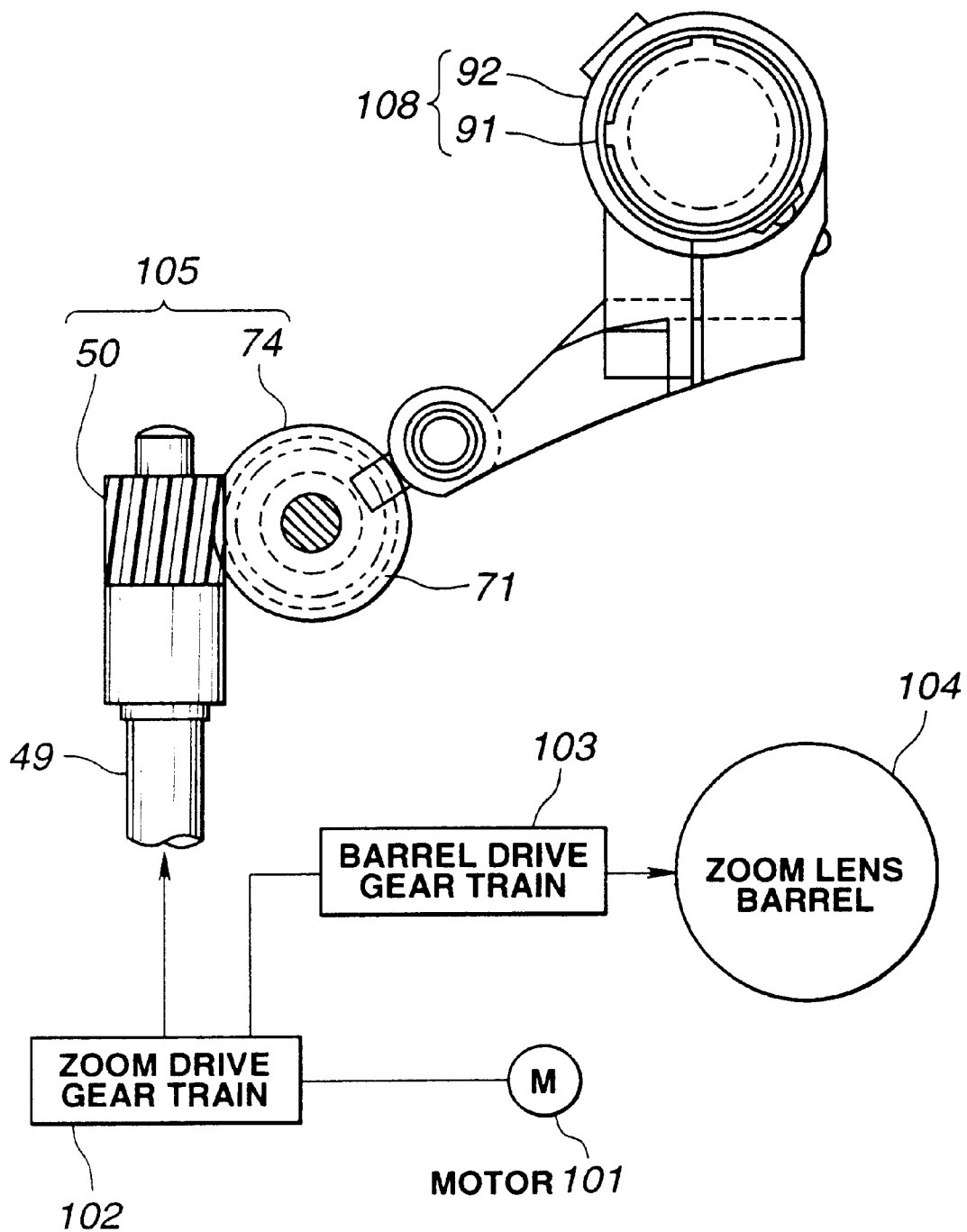
FIG. 5 is a schematic diagram of a drive system for the zoom finder optical system and the zoom lens barrel in the camera of the first embodiment.

Referring to FIG. 3 through FIG. 5, the zoom view finder drive mechanism that drives the zoom view finder optical system is discussed. FIG. 3 is a vertical section of the zoom view finder drive mechanism. FIG. 4 shows the development of a F cam. FIG. 5 is a schematic diagram of the drive system, showing the relative relationship between the zoom view finder optical system and the zoom lens barrel in the camera of the first embodiment.

As shown in FIG. 3, the F cam 71 is a cylinder cam having cam faces 71a and 71b on its circumference. The F cam 71 is rotatably supported by the F body 76 in a manner such that the F cam 71 is parallel to a finder shaft (hereinafter referred to as F shaft) 80 that supports the objective lens unit 97 (FIG. a). Attached onto the F cam 71 are clutch plates 72*a*, 72*b*, and 72*c*, a clutch spring 73, a view finder gear (hereinafter F gear) 74, and an E-ring 75.

The first lens 91 and second lens 92, have cam followers 91*a* and 92*a*, respectively which are slidably supported on the F shaft 80 that is affixed onto the F body 76, generally in the direction of the optical axis of the objective lens unit 97. The cam followers 91*a* and 92*a* are respectively urged by a first lens spring 77 and a second lens spring 78, loaded on the F shaft 80, so that the cam followers 91*a* and 92*a* remain in contact with the cam faces 71*a* and 71*b* respectively.

FIG. 4 shows the development of the cam faces 71*a* and 71*b* formed on the F cam 71. As the F cam 71 rotates, the cam faces 71*a* and 71*b*, respectively drive the first lens 91 and second lens 92 generally along the optical axis to vary the angle of field of the zoom view finder optical system in response to the focal length of the zoom imaging optical system.

The imaging optical system and the zoom drive in the view finder optical system are now discussed.

Referring to FIG. 5, the drive motor (M) 101 is a sequence motor for driving every drive section in the camera. The drive motor 101 drives the zoom lens barrel 104 through the zoom drive gear train 102 and the barrel drive gear train 103 while driving the zoom finder optical system 108 through the zoom drive gear train 102, the view finder drive gear train 105 and the view finder cam.

The zoom drive gear train 102 has a predetermined gear reduction ratio and is coupled to the barrel drive gear train 103 that drives the zoom lens barrel 104. The zoom lens barrel 104 includes the zoom imaging optical system therein (see FIG. 12). When driven by the barrel drive gear train 103, the zoom lens barrel 104 varies the focal length of the zoom imaging optical system.

Figure 11:
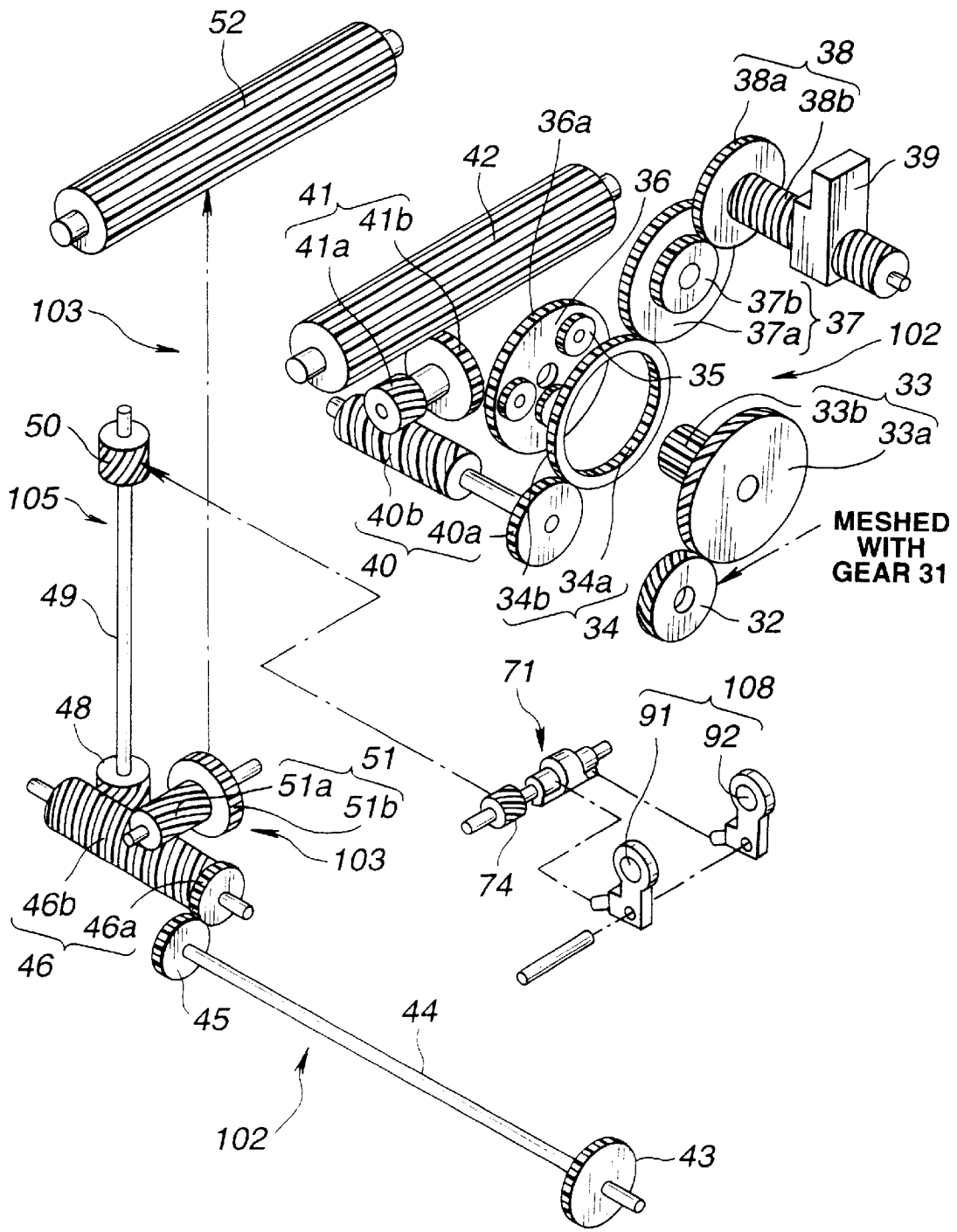
FIG. 11 is an exploded perspective view showing the stage of the drive system of the drive power transfer mechanism, downstream of the transmission, in the camera of the first embodiment.

As best shown in FIG. 11, the zoom drive gear train 102 is coupled to an F gear 50, which meshes with an F gear 74, and drives the zoom view finder optical system 108 through the F gear 74. The construction of the zoom drive gear train 102 and the barrel drive gear train 103 will be detailed below.

Figure 6:
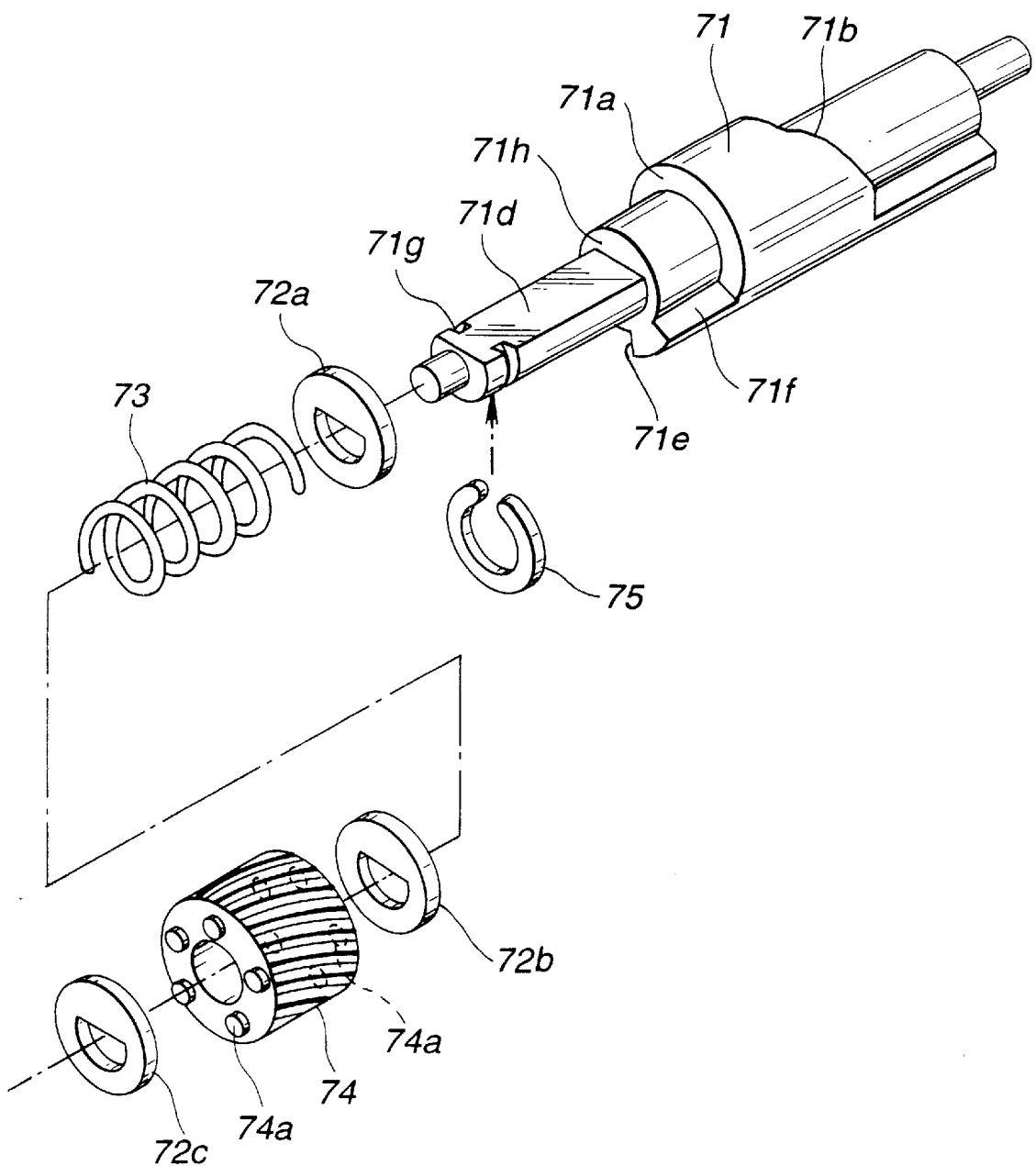
FIG. 6 is an exploded perspective view showing a friction clutch and an F cam in the zoom view finder drive in the camera of the first embodiment.

The F gear 50 and F gear 74 are helical gears with their shafts crossed at a right angle and are in mesh with each other. The rotation of the F gear 74 is transferred to the F cam 71 via the friction clutch mechanism 106 which is best shown in FIG. 6. Normally, the F cam 71 rotates integrally with the F gear 74, thereby driving the zoom view finder optical system 108. When the zoom view finder optical system 108 is restrained a sliding action takes place in the friction clutch mechanism 106, and the zoom view finder optical system 108 is not driven.

The zoom view finder drive 107, including the friction clutch mechanism 106 and the F cam 71, are now discussed in detail.

FIG. 6 is an exploded perspective view of the friction clutch mechanism 106 and the F cam 71. The F cam 71 is affixed to the shaft that runs parallel to the finder optical axis and that is rotatably supported by the F body 76 (see FIG. 3), and is the cylinder cam having the cam faces 71*a* and 71*b* on its circumference as shown in the development in FIG. 4.

The F cam 71 has two radial flat portions 71*e* and 71*f* that extend axially. With the flat portions 71*e* and 71*f* respectively engaged with a rotation stopper 76*a* (FIGS. 7 and 8) of the F body 76 and a first lens cam follower 91*a*, the rotation range of the F cam 71 is limited.

Each of the clutch plates 72*a*, 72*b*, and 72*c* have a D-shaped hole in its center, through which the F cam 71 is inserted with the D-shaped hole engaged with the D-cut surface 71*d* of the F cam 71 so that the clutch plates are axially slidable onto the surface 712 but their rotation is restrained. When the clutch plates 72*a*–72*c* rotate, the F cam 71 integrally rotates therewith. The clutch plate 72*a*, under the urging of the clutch spring 73, is engaged with an abutment surface 71*h* of the F cam 71. The clutch spring 73 is mounted between the clutch plates 72*a* and 72*b* with a predetermined bias applied.

The helical F gear 74, having its shaft at a right angle to the shaft of the gear meshed therewith, is rotatably supported around the shaft portion of the F cam 71 having the D-cut surface 71*d*. The F gear 74 has, on its axial end faces, a plurality of projections 74*a*, which are axially engaged with the clutch plates 72*b* and 72*c* to generate a predetermined friction force.

The E-ring 75 is seated in a groove 71*g* formed on the shaft portion of the F cam 71, and sets the urging of the clutch spring 73 and prevents the clutch plates 72*b*, 72*c* and the F gear 74 from axially coming off of the F cam 71.

The F gear 74, under the urging of the clutch spring 73, is held between the clutch plates 72*b* and 72*c* with the projections 74*a* engaged therewith. The F gear 74 is normally rotated with the F cam 71 in this state. When the load rotational torque of the F cam 71 is equal to or lower than a predetermined torque, the rotational torque of the F gear 74 is transferred to the clutch plates 72*b* and 72*c* by means of the friction between the projections 74*a* and the clutch plates 72*b* and 72*c*. Since the rotation of the clutch plates 72*b* and 72*c* is restrained by the D-cut surface 71*d* of the F cam 71 as already described, the F cam 71 is rotated integrally therewith.

On the other hand, when the load rotational torque of the F cam 71 is g-greater than the predetermined torque or when the rotation of the F cam 71 is restrained, the F gear 74 only is driven, sliding between the clutch plates 72*b* and 72*c*.

Figure 7:
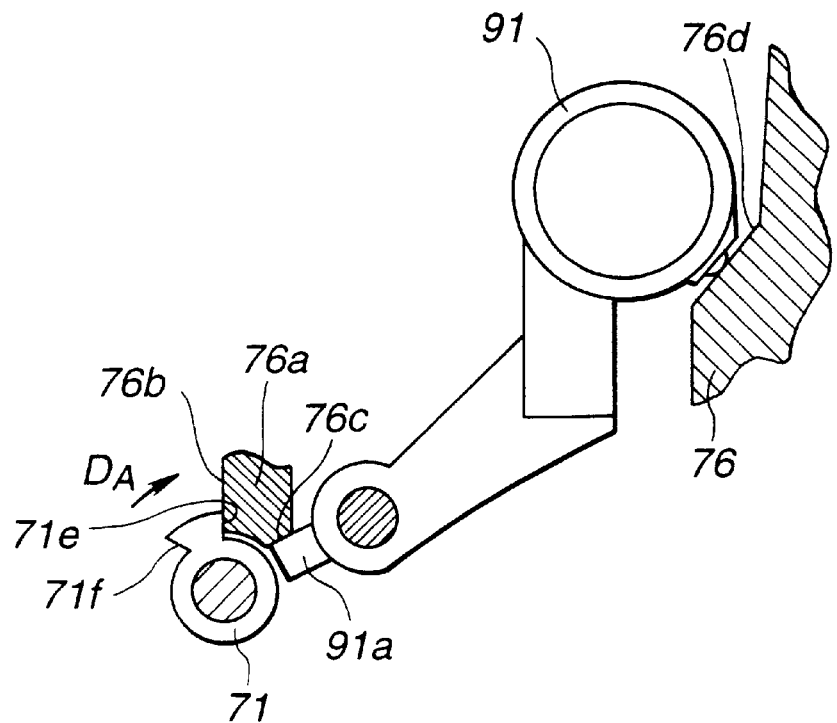
FIG. 7 is a cross-sectional view of the F cam and its associated components, viewed from the side of a subject, in the zoom view finder drive mechanism of the camera of the first embodiment, wherein the F cam is rotated clockwise.
Figure 8:
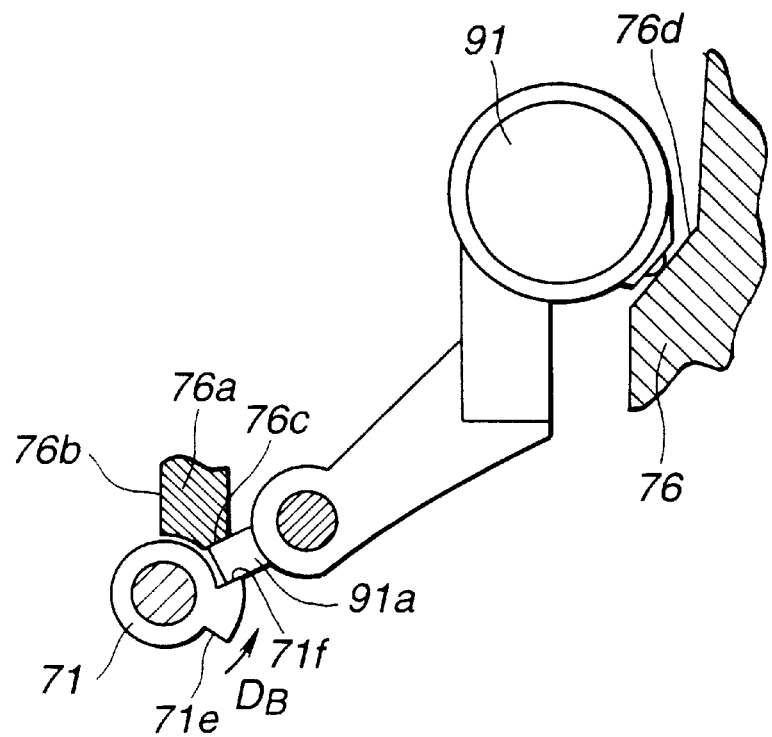
FIG. 8 is a cross-sectional view of the F cam and its associated components, viewed from the side of the subject, in the zoom view finder drive mechanism of the camera of the first embodiment, wherein the F cam is rotated counter-clockwise.

FIG. 7 and FIG. 8 are cross-sectional views of the F cam and its associated components in the zoom view finder drive 107, viewed from a subject whose picture is being taken. The F cam 71 rotates clockwise in a DA direction (FIG. 7), or counterclockwise in a DB direction (FIG. 8), with the flat portion 71*e* or 72*f* abutting the rotation stopper 76*a* or the cam follower 91*a* against the rotation stopper 76*a*. The first lens 91 is urged clockwise as shown in FIG. 7. The second lens 92 is also urged in the same direction.

The F body rotation stopper 76*a* is formed on the F body 76. When the F cam 71 is rotated clockwise in the DA direction, the flat portion 71*e* of the F cam 71 abuts a flat portion 76*b* of the rotation stopper 76*a*, and the rotation of the F cam 71 in the DA direction is thus restrained. The position of the rotation stopper 76*a* is set up and adjusted so that the position of the F cam 71 in this state is a telephoto position in the view finder optical system.

When the F cam 71 is rotated counterclockwise in the DB direction, the first lens cam follower 91*a* is held between the flat portion 71*f* of the F cam 71 and the flat portion 76*c* of the rotation stopper 76*a*, and the rotation of the F cam 71 in the DB direction is thus restrained. The position of the rotation stopper 76*a* is set up and adjusted so that the position of the F cam 71 in this state is a wide-angle position in the view finder optical system.

If the F gear 74 is driven in an attempt to rotate the F cam 71 further in the DA direction or in the DB direction in the above rotation restrained state, the projections 74*a* of the F gear 74 slide between the clutch plates 72b and 72c. The F cam 71 fails to rotate, while the F gear 74 only rotates. The telephoto state or the wide-angle state is thus maintained in the zoom view finder optical system 108.

The zoom operation of the zoom lens barrel 104 and the zoom view finder drive 107 is now discussed.

The zoom lens barrel 104 and zoom view finder optical system 108 are operated for zoom in and zoom out via the zoom drive gear train 102 and the like with the drive motor 101 rotated as shown in FIG. 1 in a predetermined direction.

The zoom drive gear train 102 reduces the speed of the rotational torque of the drive motor 101 at a predetermined ratio, and transfers it to the barrel drive gear train 103 and zoom view finder drive 107. The barrel drive gear train 103 transfers the drive power from the zoom drive gear train 102 to the zoom lens barrel 104.

The drive power transferred from the barrel drive gear train 103 drives the zoom imaging optical system of the zoom lens barrel 104 as described later, thereby varying the focal length to cause the imaging optical system to zoom in and zoom out.

The finder drive gear train 105 is driven in the zoom view finder drive 107 which is driven by the barrel drive gear train 103. The drive power of the view finder drive gear train 105 is transferred to the friction clutch mechanism 106 and then to the F cam 71, thereby driving the first lens 91 and second lens 92 in the zoom view finder optical system 108 for zoom driving.

Referring to FIGS. 3, 7 and 8, the operation of the friction clutch mechanism 106 is discussed.

Since the F gear 74, driven by the view finder drive gear train 105, is pressed between the clutch plates 72b and 72c under the urging of the clutch spring 73, the rotational torque of the F gear 74 is transferred to the clutch plates 72b and 72c by means of the friction force. Since the clutch plates 72b and 72c are locked to the F cam 71 in rotation, the rotation of the clutch plates 72b and 72c causes the F cam 71 to rotate therewith.

The drive power is transferred from the F gear 74 to the clutch plates 72b and 72c by means of the friction force. When the rotational torque of the F cam 71 is greater than the predetermined torque or when the F cam 71 is restrained from rotation, the F gear 74 only rotates, sliding between the clutch plates 72b and 72c.

The rotational torque of the F cam 71 is a torque TD for driving the first lens 91 and second lens 92 generally along the optical axis (hereinafter referred to as the view finder driving torque), and the view finder driving torque is determined by the force of the first lens spring 77, the force of the second lens spring 78, the lead angles of the cam faces 71a and 71b, and the respective friction coefficients between the cam followers 91a and 92b and cam faces 71a and 71b.

A torque at which the F gear 74 starts sliding between the clutch plates 72b and 72c (hereinafter referred to as slip torque) is set to be sufficiently larger than the view finder driving torque TD.

Now, the slip torque TS is determined. Let $\mu$ represent the coefficient of friction between the F gear 74 and the clutch plates 72b and 72c under the urging force F of the clutch spring 73, and let R represent the position of the projections 74a of the F gear 74 where the projections 74 are in contact with the clutch plates 72b and 72c, namely, the distance between the projections 74a and the center of rotation of the F gear 74. The following equation holds;

$$TS = 2R\mu F \quad (1)$$

The materials of the F gear 74, clutch plates 72b and 72c, the force of the clutch spring 73 and the position of the projections 74a are determined so that the slip torque TS is greater than the view finder driving torque TD in equation (1).

Since slip torque TS>view finder driving torque TD, the rotational torque of the F gear 74 is transferred to the F cam 71 when the F cam 71 is not restrained. The F cam 71 drives the first lens 91 and second lens 92 to vary the angle of field of the zoom view finder optical system in response to the focal length of the zoom imaging optical system.

The correction of the zoom position deviation between the view finder optical system and the lens barrel using the friction clutch mechanism 106 is now discussed.

In the state shown in FIG. 7, the F cam 71 cannot be rotated further in the DA direction with the flat portion 71e abutting the flat portion 76b of the stopper 76a of the F body. If an attempt is made to rotate the F gear 74 in a direction to rotate the F cam 71 in the DA direction, the F gear 74 only rotates with the F cam 71 remaining stationary, as already described.

In the state shown in FIG. 8, the flat portion 71f abuts the cam follower 91a against the flat portion 76c of the F body stopper 76a. If an attempt is made to rotate the F cam 71 in the DB direction, the F gear 74 only rotates in the same way as shown in FIG. 7, with the F cam 71 remaining stationary.

As already described, the position of the stopper 76a for restraining the rotation of F cam 71 is set to be the telephoto position and wide-angle position. A deviation may take place between the angle of field of the zoom view finder optical system 108 and the focal length of the zoom imaging optical system of the zoom lens barrel 104. However, once the zoom imaging optical system is zoomed in or out to the telephoto position or the wide-angle position, the zoom lens barrel 104 is aligned with the zoom view finder optical system 108 in zoom position.

For example, when the zoom view finder optical system 108 is further into the telephoto side than the zoom imaging optical system of the zoom lens barrel 104 is, the zoom imaging optical system may be driven to the telephoto side until the flat portion 71e of the F cam 71 abuts the rotation stopper 76a of the view finder body.

The friction clutch mechanism 106 operates until the zoom imaging optical system reaches the telephoto position. Meanwhile, the F gear 74 slips between the clutch plates 72c and 72b keeping the zoom view finder optical system 108 in the telephoto state.

When the zoom imaging optical system reaches the telephoto position, both the zoom imaging optical system and the zoom finder optical system 108 enter the telephoto state. This completes the correction process.

When the zoom view finder optical system 108 is positioned further into the wide-angle side than the zoom imaging optical system is, the zoom imaging optical system of the zoom lens barrel 104 is driven to the wide-angle side. This puts both the zoom imaging optical system and the zoom view finder optical system 108 into the wide-angle state.

The construction of the camera body, housing the drive mechanisms including gear trains, the zoom lens barrel, and the zoom view finder optical system is now discussed. Referring to a perspective view of the camera body in FIG. 9, the construction of the camera body incorporating the mechanisms of the present invention is discussed first.

Figure 9:
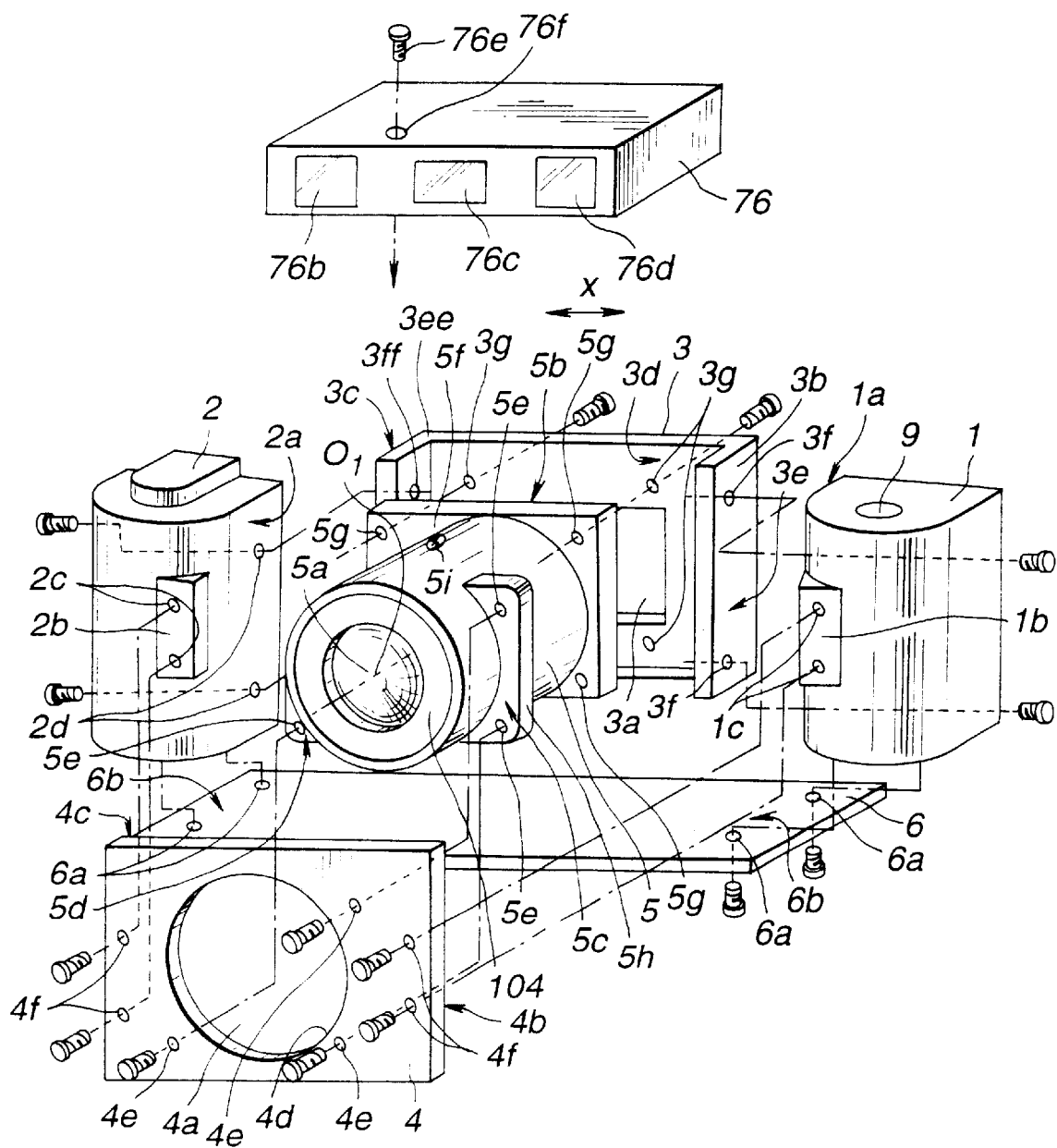
FIG. 9 is an exploded perspective view of the body of the camera of the first embodiment.

As shown in FIG. 9, the camera body includes; a spool chamber unit 1 forming a spool chamber, a cartridge chamber unit 2 forming a cartridge chamber, a rail member 3 (first connecting member) that is a substantially planar connecting member, a lens barrel unit 5 housing a zoom lens barrel 104 for holding a imaging lens 5a, a connection reinforcement member 4 (second connecting member) that is a substantially planar connecting member for reinforcing the connection of units from the front side of the camera body, and a bottom connecting member 6 (third connecting member) that is a substantially planar and elongated member for reinforcing the connection of the units from below.

A film takeup spool 9 for taking up an exposed roll of film is rotatably supported in the spool chamber unit 1. The cartridge chamber unit 2 houses a film cartridge (not shown) within which an unexposed, photosensitive roll of film is loaded.

The rail member 3 is provided with an aperture opening 3a and a guide rail (not shown), and serves as a connecting member that connects the spool chamber unit 1, cartridge chamber unit 2 and lens barrel unit 5.

The rail member 3 is thus provided with the aperture opening 3a in the center and the guide rails on its back side. The aperture opening 3a forms the frame through which a luminous flux from the lens barrel unit 5 passes. Along with a pressure plate (not shown) arranged on the rear cover (not shown) of the camera, the guide rails assure the flatness of the roll film by pressing the film on both side edges and define the position of the film relative to the aperture opening 3a.

The connection reinforcement member 4 has, in its approximate center, an opening 4a approximately equal to the lens barrel unit 5 in terms of radius and configuration. The connection reinforcement member 4 has, at predetermined positions on the periphery of the opening 4a, three through-holes 4e for mounting the barrel unit. The connection reinforcement member 4 is provided with two pairs of through-holes 4f, one pair for mounting the spool chamber unit 1 and the other pair for mounting the cartridge chamber unit 2.

The lens barrel unit 5 has a cylindrical form, and includes the imaging lens 5a inside. A rib 5h is integrally formed with the circumference of the lens barrel unit 5 on its approximately axially middle position. The rib 5h is provided with screw holes 5e corresponding to the through-holes 4e.

A generally planar, barrel mounting plate 5f is integrally attached to the lens barrel unit 5 at its rear end. The barrel mounting plate 5f has, in its approximate center, an opening (not shown) approximately equal to the lens barrel unit 5 in radius and configuration. The barrel mounting plate 5f has, on its four corners, four screw holes 5g for mounting the rail member. Referring to FIG. 9, there are shown three screw holes 5g only.

The rib 5h and the barrel mounting plate 5f may be molded integrally with the lens barrel unit 5. Alternatively, these components may be separately molded, and then glued onto the predetermined positions on the lens barrel unit 5 using adhesive means such as an adhesive agent.

The rib 5h and the barrel mounting plate 5f of the lens barrel unit 5 are set to be perpendicular to the optical axis O1 of the imaging lens 5a.

The rail member 3 has bent portions 3e and 3ee, which are formed by bending both short edge portions frontward at a right angle. One bent portion 3e is provided with two through-holes 3f for mounting the spool chamber unit 1, and the other bent portion 3ee is provided with two through-holes 3ff for mounting the cartridge chamber unit 2.

The rail member 3 has, in its approximate center, the aperture opening 3a which forms the frame of a photograph. In order to secure the rail member 3 to the barrel mounting plate 5f of the lens barrel unit 5, the rail member 3 has, on the periphery of the aperture opening 3a, four through-holes 3g, corresponding to the screw holes 5g in the barrel mounting plate 5f. Referring to FIG. 9, there are shown only three through-holes 3g out of the four.

The spool chamber unit 1 has, on its front side facing the lens barrel unit, a connection portion 1b for connecting the spool chamber unit 1 to the connection reinforcement member 4. The connection portion 1b is provided with two screw holes 1c corresponding to the through-holes 4f. The spool chamber unit 1 has, on its inner side, namely, on its side facing the lens barrel unit, two screw holes (not shown) for connecting the spool chamber unit 1 to the rail member 3. Furthermore, the spool chamber unit 1 has, on its bottom side, two screw holes (not shown) for holding the spool chamber unit 1 on the bottom connecting member 6.

Like the spool chamber unit 1, the cartridge chamber unit 2 has, on its front side facing the lens barrel unit 5, a connection portion 2b for connecting the cartridge chamber unit 2 to the connection reinforcement member 4. The connection portion 2b has two screw holes 2c corresponding to the through-holes 4f. The cartridge chamber unit 2 has, on its inner side, namely, on its side facing the lens barrel unit, two screw holes 2d for connecting the cartridge chamber unit 2 to the rail member 3. Furthermore, the cartridge chamber unit 2 has, on its bottom side, two screw holes (not shown) for holding the cartridge chamber unit 2 on the bottom connecting member 6.

The bottom connecting member 6 has four through-holes 6a, two on the left-hand side, and the other two on the right-hand side, corresponding to the screw holes (not shown) formed on the bottom sides of the spool chamber unit 1 and cartridge chamber unit 2.

The F body 76 that houses a view finder unit such as the zoom view finder optical system 108 is rigidly attached on top of the lens barrel unit 5. More specifically, a screw 76e is screwed into a screw hole 5i in the lens barrel unit 5 through a mounting hole 76f of the F body 76. Besides the view finder optical system, the F body 76 is provided with range-finding windows 76b and 76d, a view finder window 76c, etc.

The camera body of the camera of this embodiment is assembled by connecting these components.

Now discussed is the drive power transfer mechanism incorporated in the camera of the present invention and including the drive motor 101, zoom drive gear train 102, and barrel drive gear train 103.

Figure 10:
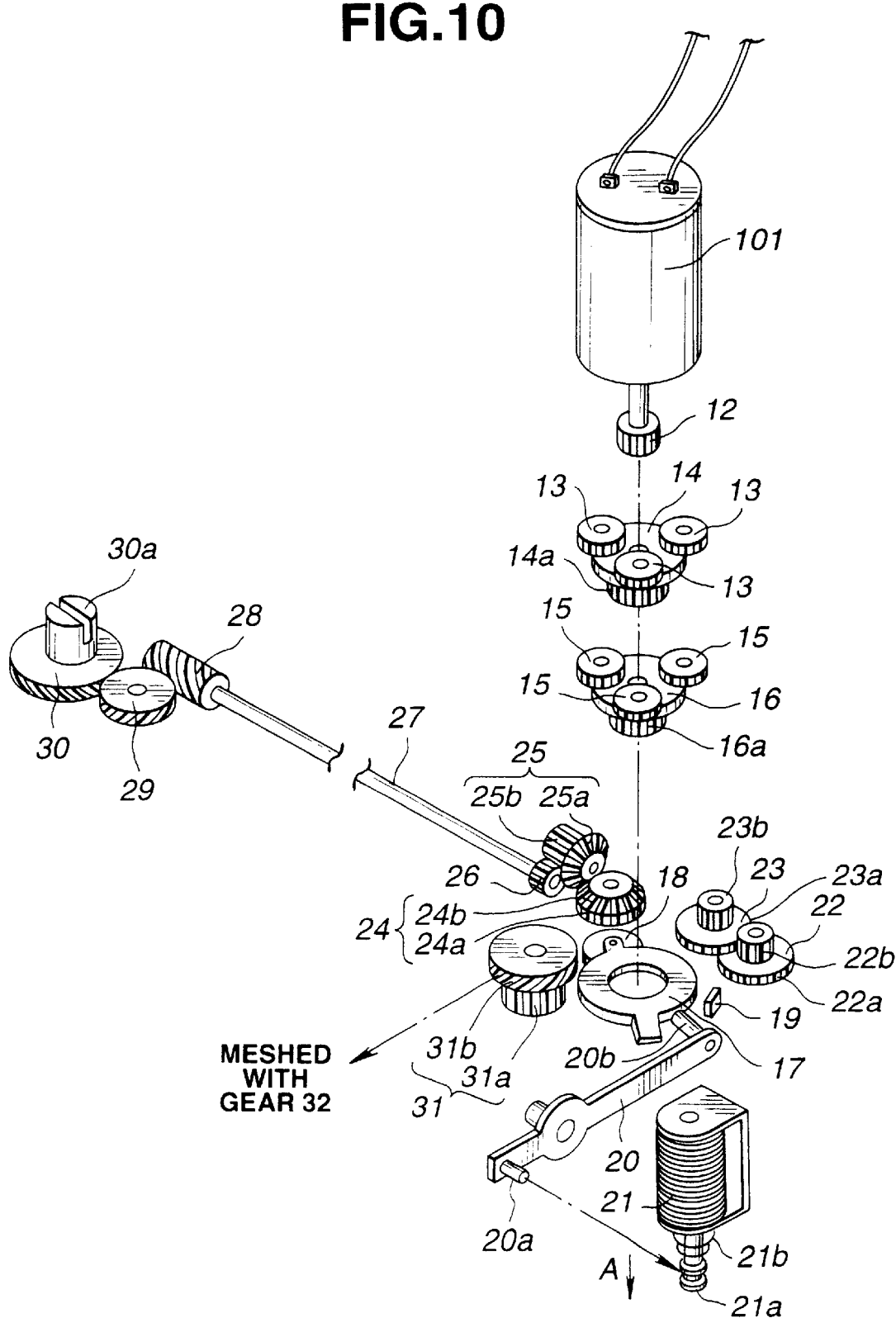
FIG. 10 is an exploded perspective view of the drive motor, a transmission and its associated components, of the drive system in the drive power transfer mechanism in the camera of the first embodiment.

FIG. 10 is an exploded perspective view of the drive motor, a transmission and its associated components of the drive system in the drive power transfer mechanism. FIG. 11 is an exploded perspective view showing the stage of the drive system, downstream of the transmission.

Referring to FIG. 10 and FIG. 11, the construction of the drive system in the drive power transfer mechanism is discussed. The drive motor 101, serving as a drive source for each drive system, is rigidly secured to a base plate affixed to the spool chamber unit 1. A pinion gear 12, rigidly attached to the output shaft of the drive motor 101, is meshed with three epicyclic gears 13 that are rotatably supported by a carrier 14.

A sun gear 14a rigidly attached to the carrier 14 is meshed with three epicyclic gears 15 that are rotatably supported by a carrier 16. A sun gear 16a is rigidly attached to the carrier 16. The epicyclic gears 13 and 15 are in mesh with internal gears arranged on the base plate in the spool chamber unit 1.

The epicyclic gears 13, sun gear 14a, epicyclic gears 15, sun gear 16a, and internal gears constitute an epicyclic speed-reduction mechanism.

The sun gear 16a on the carrier 16 is always meshed with an epicyclic gear 18 rotatably supported on the end portion of a carrier arm 17. The epicyclic gear 18 is rotatably supported by the carrier arm 17 with friction, so that the epicyclic gear 18 rotates about its own axis while revolving about the carrier arm 17 at the same time.

A lock lever 20 is pivotally supported in the spool chamber unit 1, and has pins 20a and 20b. The pin 20a is engaged with a movable iron core 21a of a plunger 21, which is an electromagnet. The lock lever 20 is pivoted as the plunger 21 is turned on and off, drawing and releasing movable iron core 21a. The movable iron core 21a is urged in the direction of A by a spring 21b.

When the plunger 21 is turned on, the lock lever 20 is pivoted to a released position from a locked state in which the pin 20b is engaged with the carrier arm 17, and the carrier arm 17 is enabled to turn clockwise or counterclockwise. The rotary motion of the carrier arm 17 causes the epicyclic gear 18 to be in mesh with one of a double-gear 31, a double-gear 22, or a double-gear 24.

When the carrier arm 17 is at a counterclockwise restrained position, the epicyclic gear 18 is in mesh with a spur gear portion 31a of the double-gear 31. When the carrier arm 17 is at a clockwise restrained position, the epicyclic gear 18 is in mesh with a spur gear portion 24a of the double-gear 24. When the carrier arm 17 turns counterclockwise without being restrained, the epicyclic gear 18 is in mesh with a large-diameter gear portion 22a of the double-gear 22.

The double-gear 31 is composed of the spur gear portion 31a and a helical gear portion 31b. The double-gear 22 is composed of the large-diameter gear portion 22a and a small-diameter gear portion 22b. The double-gear 24 is composed of the spur gear portion 24a and a bevel gear portion 24b.

The detection of the rotary motion of the carrier arm 17 is made by detecting a light from a reflecting plate attached to the carrier arm 17 using a photoreflector (hereinafter referred to as PR) 19.

The small-diameter gear portion 22b of the double-gear 22, with which the epicyclic gear 18 is meshed, is in mesh with a large-diameter gear portion 23a of a double-gear 23. A small-diameter gear portion 23b of the double-gear 23 is in mesh with a gear (not shown) arranged on the spool 9 (see FIG. 9) of the spool chamber.

The bevel gear portion 24b of the double-gear 24, with which the epicyclic gear 18 is meshed, is in mesh with a bevel gear portion 25a of a double-gear 25 that is composed of the bevel gear portion 25a and a spur gear portion 25b. The spur gear portion 25b of the double-gear 25 is in mesh with a spur gear 26.

A worm 28 is rigidly attached to the shaft 27 to which the spur gear 26 is rigidly attached. The worm 28 is in mesh with a worm wheel 29. The worm wheel 29 is in mesh with a rewind gear (hereinafter referred to as RW) 30. A RW fork 30a is supported by the RW gear 30 in a manner such that the RW fork 30a is projected and retracted.

The shaft 27, to which the spur gear 26 and worm 28 are rigidly attached, is supported by the bottom connecting member 6. The worm wheel 29 and RW gear 30 are arranged in the cartridge chamber unit 2.

The helical gear portion 31b of the double-gear 31, with which the epicyclic gear 18 is meshed, is in mesh with an idle gear 32 (FIG. 11). The idle gear 32 is in mesh with a helical gear portion 33a of a double-gear 33 composed of the helical gear portion 33a and a sun gear portion 33b as shown in FIG. 11. The sun gear portion 33b of the double-gear 33 is in mesh with three epicyclic gears 35.

The epicyclic gears 35, rotatably supported by a carrier 36 having a spur gear portion 36a, are in mesh with an internal gear portion 34a of an internal/external gear 34, which has the internal gear portion 34a and an external gear portion 34b. The sun gear portion 33b, epicyclic gears 35, carrier 36 and internal/external gear 34 constitute an epicyclic speed-reduction mechanism.

The external gear portion 34b of the internal/external gear 34 is in mesh with a large-diameter gear portion 37a of a double-gear 37, which has the large-diameter gear portion 37a and a small-diameter gear portion 37b. The small-diameter gear portion 37b of the double gear 37 is in mesh with a spur gear portion 38a of a feed screw 38, which is composed of the spur gear portion 38a and a feed screw portion 38b. A nut 39 is threaded onto the feed screw portion 38b, and a flash unit is driven by the nut 39.

The components from the double-gear 31 to the nut 39 are mounted inside the spool chamber unit 1.

The external gear portion 34b of the internal/external gear 34 is in mesh with a spur gear portion 40a of a double-gear 40 that is composed of the spur gear portion 40a and a worm 40b. The worm 40b of the double-gear 40 is in mesh with a worm wheel portion 41a of a double-gear 41 that is composed of the worm wheel portion 41a and a spur gear portion 41b. The spur gear portion 41b is in mesh with a long gear 42 that drives the zoom lens barrel 104 to be described later.

With the long gear 42 rotating, the zoom lens barrel 104 advances forward and recedes back into the retracted position.

The double-gear 40 and double-gear 41 are supported by the bottom connecting member 6. The long gear 42 is supported by the lens barrel unit 5.

The spur gear portion 36a of the carrier 36 is in mesh with a spur gear 43 that is rigidly attached to a shaft 44. A spur gear 45 is rigidly attached to the shaft 44. The spur gear 45 is in mesh with a spur gear portion 46a of a double-gear 46 that is composed of the spur gear portion 46a and a worm portion 46b. The worm portion 46b is in mesh with a worm wheel portion 51a of a double-gear 51 that is composed of the worm wheel portion 51a and a spur gear portion 51b.

The spur gear portion 51b is in mesh with a long gear 52 which zoom drives the zoom lens barrel 104 to be described later. With the long gear 52 rotating, the zoom lens barrel 104 is driven for zooming.

The gear trains up to the worm portion 46b correspond to the zoom drive gear train 102 shown in FIG. 1. The gear train from the worm wheel portion 51a to the long gear 52 corresponds to the lens barrel drive gear train 103 shown in FIG. 1.

The worm portion 46b is in mesh with a worm wheel 48 rigidly attached to a shaft 49. A helical F gear 50 of view finder drive gear train 105 is rigidly attached to the shaft 49. The F gear 50 is in mesh with a helical F gear 74, drives the friction clutch mechanism 106 (FIG. 1), rotates the F cam 71, and drives the zoom view finder optical system 108 for zooming.

The spur gear 43, double-gear 46 and double-gear 51 are supported by the bottom connecting member 6. The long gears 42 and 52 are housed in the zoom lens barrel 104 in the lens barrel unit 5.

Figure 12:
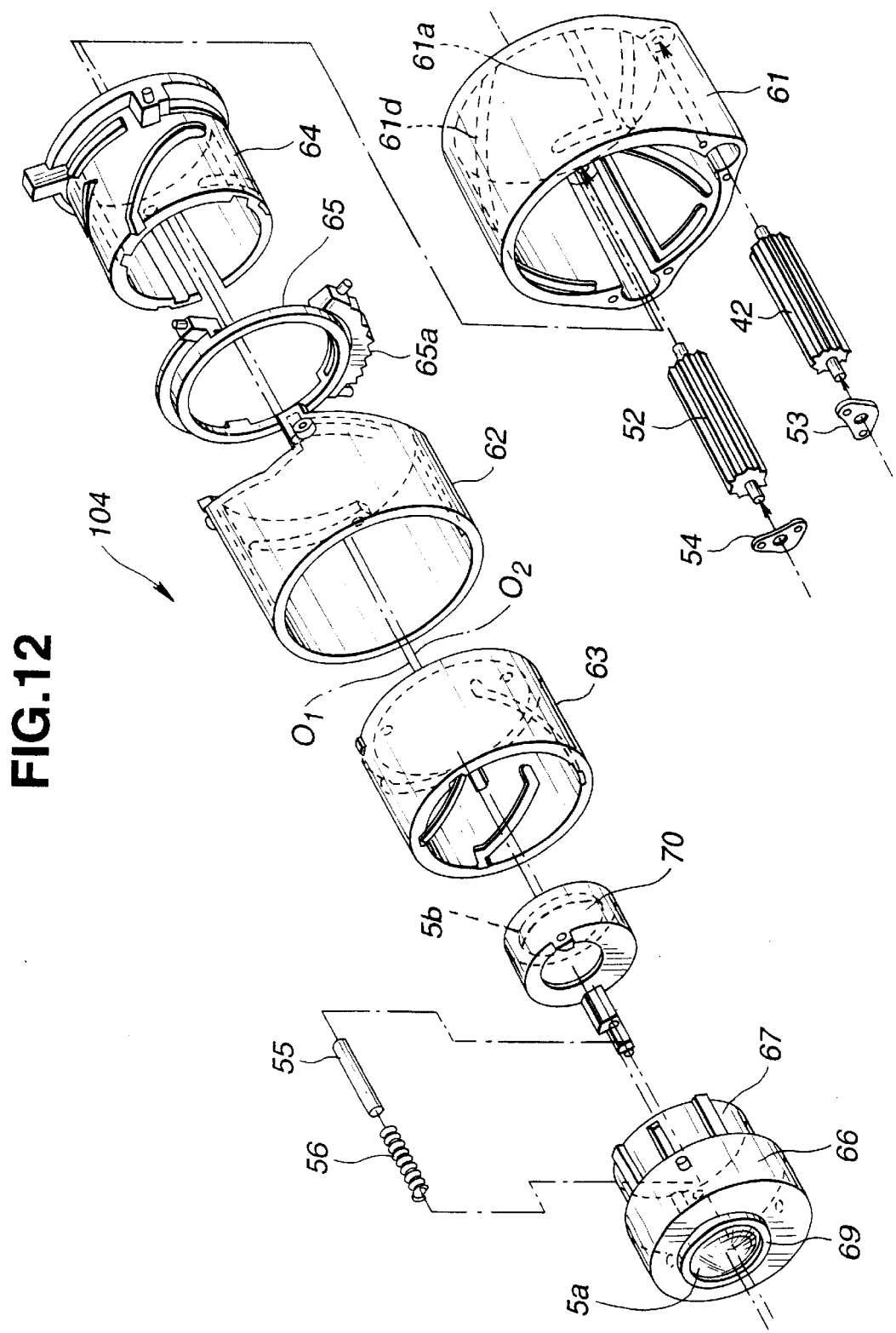
FIG. 12 is an exploded perspective view of the zoom lens barrel of the camera of the first embodiment.

The construction of the zoom lens barrel 104 in the lens barrel unit 5 (see FIG. 9) according to this embodiment of the camera is now discussed referring to an exploded perspective view in FIG. 12.

The zoom lens barrel 104 includes: a movable barrel assembly, and a cam barrel assembly. The movable barrel assembly includes a fixed barrel 61 rigidly affixed onto the camera body, a movable barrel 62 that is rotatable and advances and recedes relative to the fixed barrel 61, a float key 64 that is guided by the fixed barrel 61, and without rotating, is projected and retracted along with the movable barrel 62, a set ring 65 that advances and recedes integrally with the float key 64 but rotatable relative to the float key 64, the set drive long gear 42, driven by the drive power transfer mechanism, for rotating the set ring 65, and the zoom drive long gear 52, driven by the drive power transfer mechanism, for rotating the movable barrel 62.

Referring to FIG. 12, 01 represents the optical axis of the imaging lens, and 02 represents the center line of the lens barrel.

The movable barrel 62 advances and recedes between the retracted position where the movable barrel 62 is retracted with respect to the fixed barrel 61 and a setup position, namely, photograph-enable position. During zooming, the movable barrel 62 is rotated. The ends of the long gears 42 and 52 are supported by the fixed barrel 61 using mounting plates 53 and 54, respectively.

The cam barrel assembly includes a cam barrel 63 that is guided in the direction of rotation by the movable barrel 62 and is driven in projection and retraction by the cam of the float key 64, a first group zoom barrel (hereinafter referred to as 1Z barrel) 66 that is guided in the direction of rotation by the float key 64 and is driven in projection and retraction by the cam of the cam barrel 63, a shutter body (hereinafter referred to as S body) 67 that is driven integrally with 1Z barrel 66 in projection and retraction, is guided in the direction of rotation by the float key 64, and restrains the rotation of 1Z barrel 66. As a result, a first lens group barrel (hereinafter referred to as 1G barrel) 69 that is supported by 1Z barrel 66 and holds a first lens group of an imaging lens 5a, and a second lens group barrel (hereinafter referred to as 2G barrel) 70 that is slidably supported by the S body 67, is driven in projection and retraction by the cam of the cam barrel 63, and holds a second lens group of the imaging lens 5a.

The 2G barrel 70 is supported movably in the direction of the optical axis by a shaft 55, and a spring 56 presses the 2G barrel 70 against the cam of the cam barrel 63. To rotate the movable barrel 62 for zooming operation, the zoom drive long gear 52, which is a spur gear axially extending over the travel of operation area, is rotated. The movable barrel 62, linked with the long gear 52, is thus rotated.

The moving of the movable barrel 62 back and forth between its retracted position and projected position is carried out by rotating the set ring 65.

Specifically, the long gear 42, which is a spur gear axially extending long enough to cover the travel of operation area, and which is rotatably supported by the fixed barrel 61, is rotated by the spur gear portion 41b (see FIG. 11). Since a gear portion 65a of the set ring 65 is in mesh with the long gear 42, the set ring 65 also rotates while moving in the direction of the optical axis O1 in accordance with the cam 61b of the fixed barrel 61. In step with this motion, the movable barrel 62 is projected and retracted.

Since the clutch means is used in the drive power transfer mechanism for driving the view finder optical system in the camera finder mechanism of the camera view of this embodiment, the zoom view finder optical system 108 and zoom imaging optical system of the zoom lens barrel 104 are aligned in zoom position subsequent to the assembly. Unlike the conventional camera, it is not necessary to align the phase of the F cam 71 and the zoom lens barrel 104 during assembly. A reduction in manufacturing steps is achieved, thereby reducing manufacturing costs. Errors in manufacturing steps are precluded. Since adjustments are made individually one by one, the lens barrel and the view finder are accurately aligned.

While the user operates the camera, any force may act on the camera, possibly-destroying the correct relationship between the lens barrel and the view finder. By driving the lens barrel to the telephoto side or the wide-angle side, the correct relationship between the lens barrel and the view finder is restored. The lens barrel and the view finder are thus easily aligned.

In this embodiment, the lens barrel and the view finder are thus aligned. The present invention is not limited to this. For example, the present invention may be applied to an adjustment mechanism between the flash pop-up mechanism and the lens barrel.

A second embodiment of the camera of the present invention is now discussed. Components identical to those described in connection with the first embodiment are designated with the same reference numerals, and the discussion about them is not repeated.

In the second embodiment, the clutch mechanism is arranged in drive mechanism for driving the flash unit. As the imaging lens is projected from photograph-disable position (retracted position) to the photograph-enable position, the flash unit is projected from its retracted position to its flashing position (pop-up position). This is a pop-up flash unit.

Figure 13:
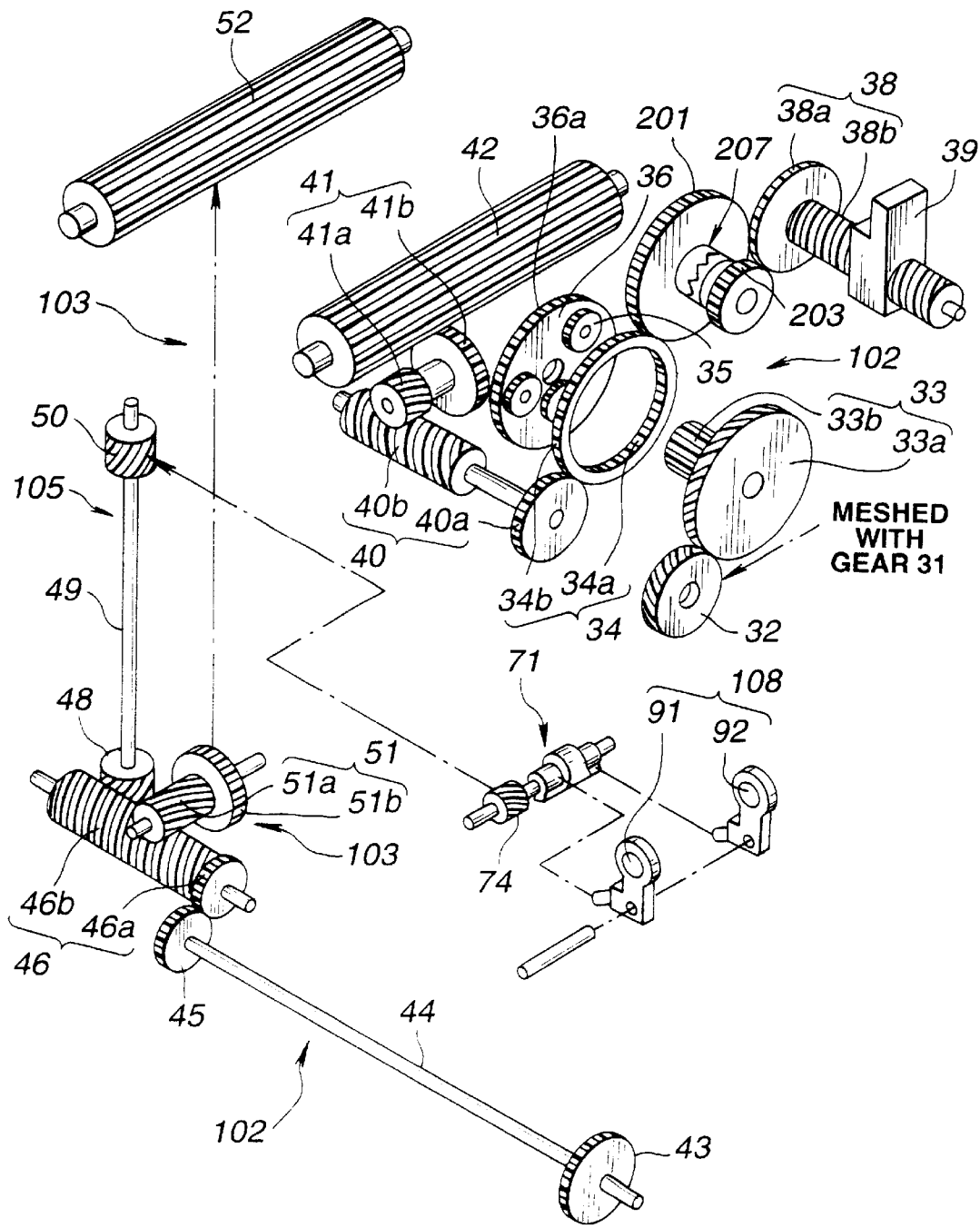
FIG. 13 is an exploded perspective view showing a major portion of the drive system of the drive power transfer mechanism in the camera according to a second embodiment.

Referring to FIG. 13, a major portion of the drive system of the drive power transfer mechanism in the camera of the second embodiment is now discussed. In FIG. 13, like elements are identified with like reference numerals.

As already described in connection with the first embodiment, the drive power of the drive motor 101 shown in FIG. 10 is transferred to the internal/external gear 34 shown in FIG. 13. The external gear portion 34b of the internal/external gear 34 is in mesh with the spur gear portion 40a of the double-gear 40 that is composed of the spur gear portion 40a and the worm portion 40b. In the same way as in the first embodiment, the worm portion 40b is in mesh with the worm wheel portion 41a of the double-gear 41 that is composed of the worm wheel portion 41a and the spur gear portion 41b. The spur gear portion 41b is in mesh with the set drive long gear 42 of the unshown zoom lens barrel 104.

On the other hand, the external gear portion 34b of the internal/external gear 34 is in mesh with a spur gear 201, and the drive power of the internal/external gear 34 is thus transferred to a spur gear 203 via the spur gear 201 and a clutch mechanism 207. The construction of the clutch mechanism 207 will be detailed later.

The spur gear 203 is in mesh with a spur gear portion 38a of a feed screw 38 that is composed of the spur gear portion 38a and a screw portion 38b. A nut 39 is threaded onto the screw portion 38b. The nut 39 is linked to a flash unit.

Figure 14:
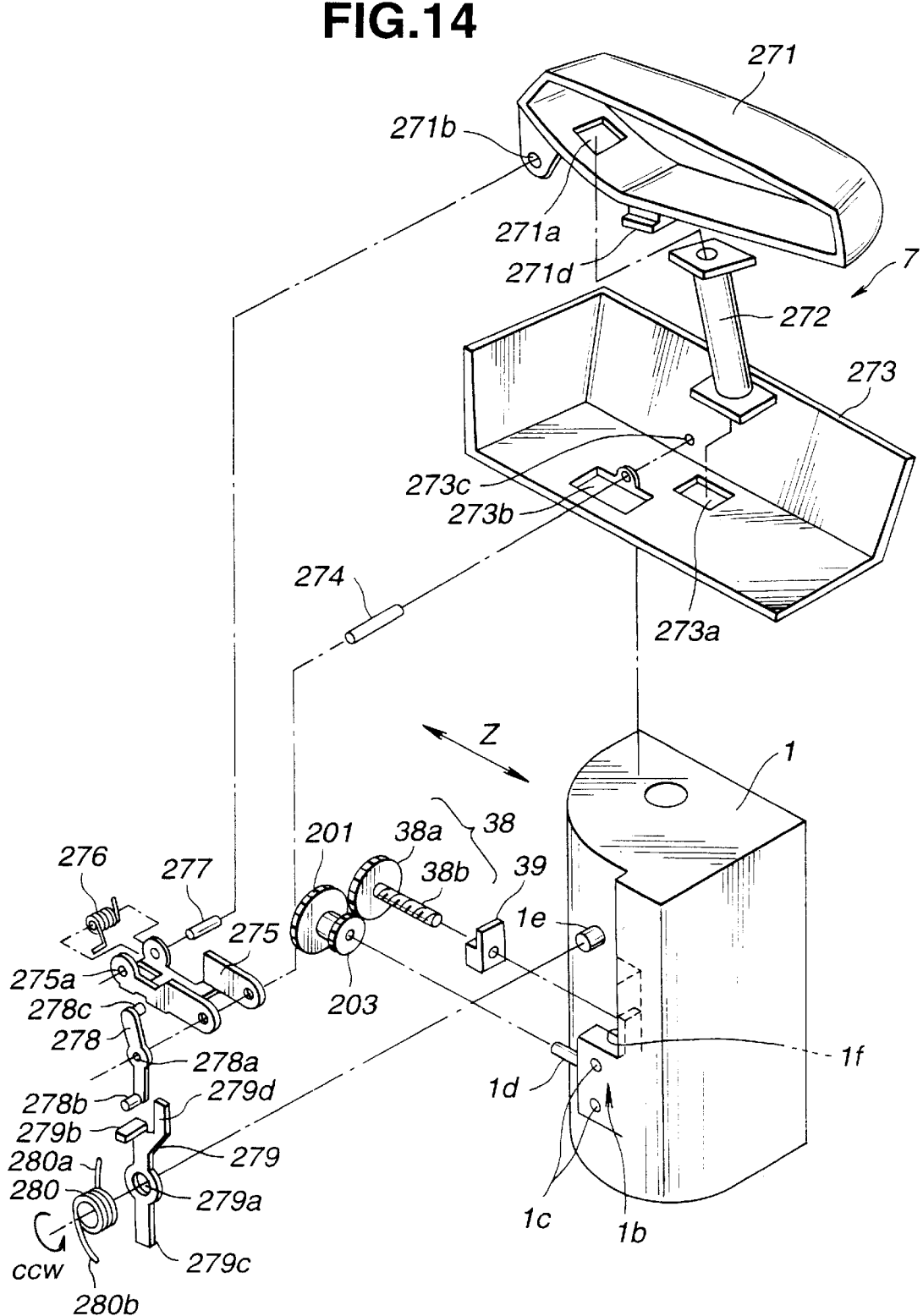
FIG. 14 is an exploded perspective view showing a major portion of a flash unit and its drive means in the camera of the second embodiment.
Figure 15:
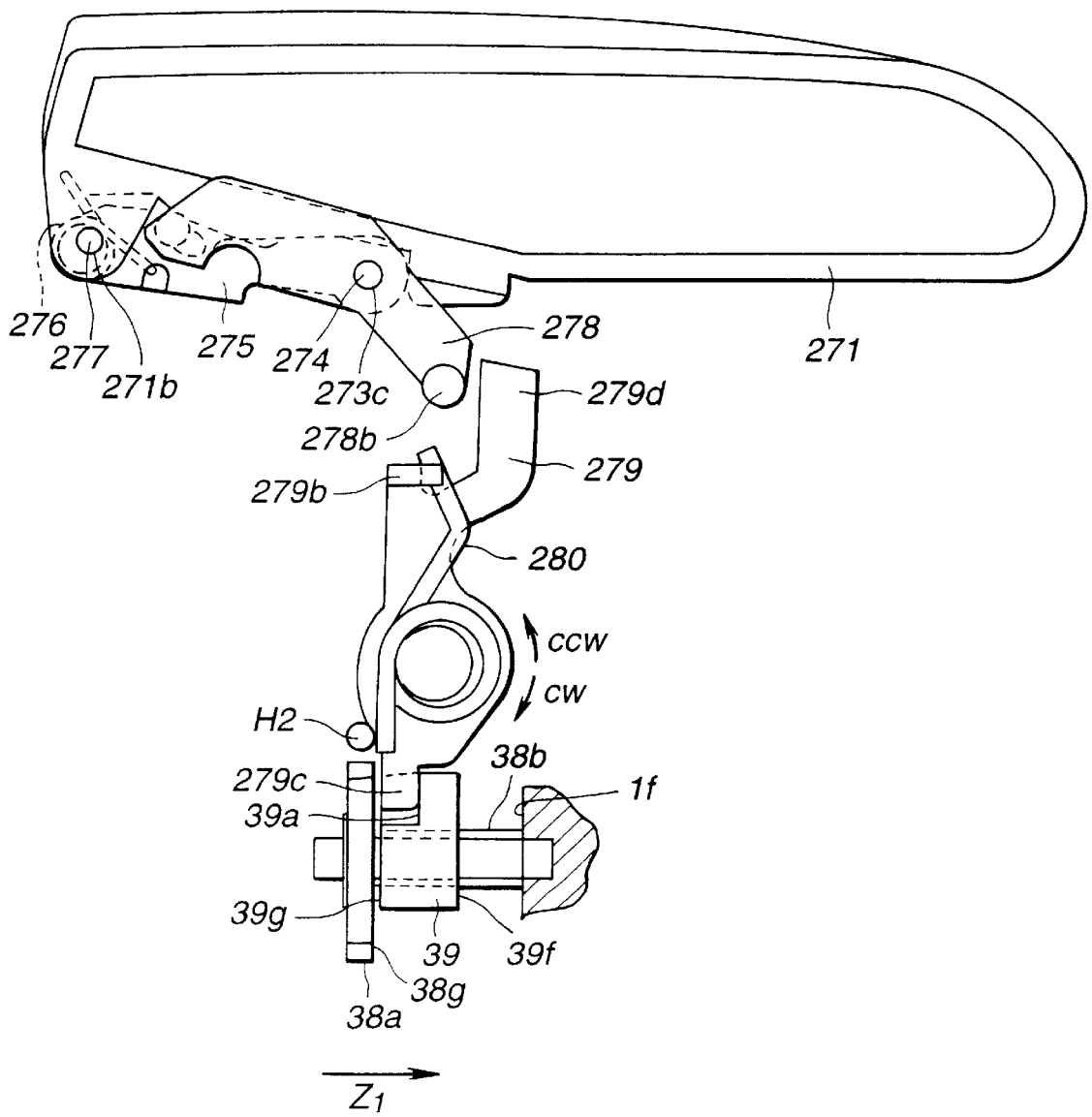
FIG. 15 is a front view showing a major portion of the flash unit and its drive mechanism in the camera of the second embodiment, wherein the flash unit is retracted in its retracted position in the camera body.
Figure 16:
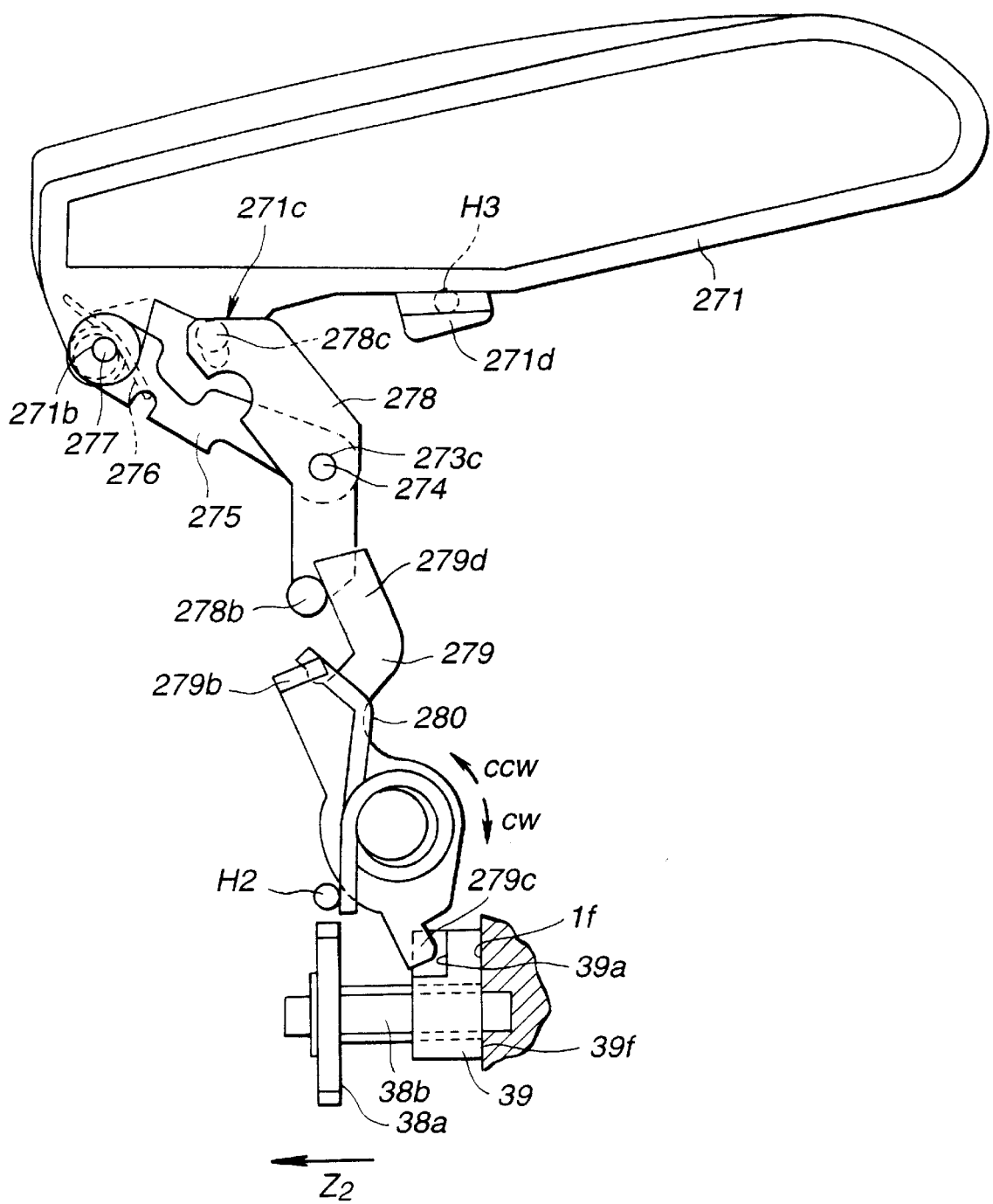
FIG. 16 is a front view showing the major portion of the flash unit and its drive mechanism in the camera of the second embodiment, wherein the flash unit is projected to its flashing position out of the camera body.

Referring to FIG. 14, FIG. 15 and FIG. 16, the flash unit and its drive means in the camera of the second embodiment are now discussed.

FIG. 14 is an exploded perspective view showing a major portion of the flash unit and its drive mechanism in the camera of the second embodiment. FIGS. 15 and 16 are plan views showing the operation of the flash unit 7 and its drive mechanism. Specifically, FIG. 15 shows the flash unit 7 in its retracted position in the camera body, and FIG. 16 shows the flash unit 17 in its flashing position out of the camera body.

Referring to FIG. 14, the flash unit 7 and its drive means are discussed. The flash unit 7 includes: a flash unit body 271 housing a movable flash module composed of a xenon (Xe) flash tube, a reflector, and an emission window, a flash socket member 273 for receiving the flash unit body 271, and a drive mechanism for driving the flash module.

No detailed drawing of the flash module is provided here. The flash module may be any of those conventionally used, and the discussion and detailed drawing of the flash module are omitted here.

The flash unit body 271 has a hole 271a on its bottom. One end of an elastic rubber round tube 272 is attached to cover the hole 271a in a water-tight fashion. The other end of the tube 272 is glued onto the flash socket member 273 to cover a hole 273a formed in the flash socket member 273 in a water-tight fashion.

Lead wires (not shown) connected to components in the flash unit body 271 are routed through the hole 271a, out of the flash unit body 271, pass through the rubber tube 272, and the hole 273a of the flash socket member 273, and are then routed into the camera body. The lead wires electrically connect the components in the flash unit body 271 to a flash circuit (not shown) in the camera body.

The flash unit body 271 has a bearing hole 271b. A shaft 277 is inserted through the bearing hole 271b and one end of a support member 275 so that the flash unit body 271 is pivotally supported. The shaft 277 is loaded with a spring 276 so that the flash unit body 271 is urged toward the direction of retraction into the camera body.

The support member 275 is pivotally connected, at the other end, to a hole 273c formed in an inner wall of the flash socket member 273 using a shaft 274. A lift lever 278 is pivotally supported at its approximately center hole 278a by the shaft 274.

The lift lever 278 extends downward through a hole 273b in the bottom of the flash socket member 273. Like the hole 273a, the hole 273b is covered with a rubber member (not shown) in a water-tight fashion. A shaft 278c extends toward the back of the camera from the top portion of the lift lever 278, and a shaft 278b extends frontward in the camera from the bottom portion of the lift lever 278.

A shaft 1d extends from the side of the connection portion 1b formed on the front side of the spool chamber unit 1. The spur gear 203 for transferring the drive power from the drive motor 101 is rotatably supported by the shaft 1d. The screw portion 38b of the feed screw 38, which is in mesh with the spur gear 203, is rotatably supported at its end above the connection portion 1b. The nut 39 is threaded onto the screw portion 38b as already described.

The drive power of the drive motor 101 is transferred via the drive transfer mechanism, rotating the screw portion 38b and thereby sliding the nut 39 in the direction of an arrow Z shown in FIG. 14.

The screw portion 38b of the feed screw 38 serves as transfer means for transferring the drive power of the drive motor 101 to the nut 39 in order to move the nut 39 from its locked position (shown in FIG. 15) to its unlocked position (shown in FIG. 16).

When the nut 39 is driven in the direction of an arrow Z2 (opposite to the direction of Z1) from the unlocked position shown in FIG. 16, a flat portion 39g of the nut 39 abuts a flat portion 38g of the spur gear portion 38a of the feed screw 38 as shown in FIG. 15, and a further driving of the nut 39 in the direction opposite to the direction of the arrow Z1 is mechanically blocked.

As the nut 39 travels, a lever member 279 is pivoted clockwise with its lower end 279c pressed by a lock portion 39a of the nut 39 as shown in FIG. 15. The flash unit body 271 shifts into the retracted position to be described later.

The top portion 297d of the lever member 279 now becomes completely clear of the shaft 278b at the bottom end of the lift lever 278. Now, the flash unit body 271 is not driven.

When the nut 39 is driven in the direction of the arrow Z1 (opposite to the direction of the arrow Z2) from the locked position as shown in FIG. 15, a flat portion 39f of the nut 39, opposite to the flat portion 39g, abuts a flat portion 1f of the spool chamber unit 1 as shown in FIG. 16. A further driving of the nut 39 in the direction opposite to the direction of the arrow Z2 is mechanically blocked.

When the nut 39 is driven in this way, the lever member 279 pivots counterclockwise, causing the flash unit body 271 to move to the flashing position to be described later. The lock portion 39a of the nut 39 becomes completely clear of the lower end 279c, and the flash unit body 271 is not driven.

A shaft 1e extends frontward from the front of the spool chamber unit 1 as shown in FIG. 14. The lever member 279 is pivotally supported at its approximate central hole 279a by the shaft 1e. The lever member serves as connection means for connecting the spool chamber unit 1 to the flash unit 7, and also as drive means for driving the flash unit 7. A spring 280 is attached to the shaft 1e.

One end 280a of the spring 280 is anchored by a hook 279b of the lever member 279, and the other end 280b is anchored by a fixed projection H2 (see FIGS. 15 and 16) on the camera body. In this way, the spring 280 continuously counterclockwise urges the lever member 279 as shown in FIG. 14. Specifically, the spring 280 urges the flash unit body 271 in the direction of projection out of the camera body when the engagement with the hook 279b of the lever member 279 is released.

The projection and retraction of the flash unit 7 out of and into the camera body in the camera thus constructed are now discussed.

When a main circuit board (not shown) of the camera is switched on with a main power switch (not shown) operated, the flash unit 7 projects out of the camera body and moves to its flashing position (as shown in FIG. 16).

When the main circuit board is switched off, the flash unit 7 moves to its retracted position in the camera body (as shown in FIG. 15). FIG. 15 shows the camera with its main power off, and FIG. 16 shows the camera ready to photograph with its main power on.

When the main power is off on the camera, the nut 39 is shifted to the position on the screw portion 38b as shown in FIG. 15. The lower end 279c of the lever member 279 remains engaged with the lock portion 39a of the nut 39. The counterclockwise pivotal motion of the lever member 279 under the urging of the spring 280 is blocked. The nut 39 serves as locking means for locking the lever member 279.

A top end 279d of the lever member 279 is clear of the shaft 278b at the lower end of the lift lever 278. The flash unit body 271 is now in its retracted position under the urging of the spring 276.

When the main circuit board (not shown) of the camera is switched on by operating the main power switch (not shown) in the state shown in FIG. 15, the drive motor 101 starts working, and the drive power of the drive motor 101 rotates the screw portion 38b in a predetermined direction via the drive power transfer mechanism. The nut 39 moves in the direction of the arrow Z1 as shown in FIG. 15.

As the nut 39 moves, the lock state of the lever member 279 is released. The lever member 279, under the urging of the spring 280, pivots counterclockwise as shown in FIG. 15.

As the lever member 279 pivots, the top end 279d of the lever member 279 abuts and presses the shaft 278b at the lower end of the lift lever 278. The lift lever 278 pivots clockwise about the shaft 274 as shown in FIG. 15.

As the lift lever 278 pivots, the shaft 278c abuts an external wall 271c on the bottom side of the flash unit body 271, pushing up the flash unit body 271 against the urging of the spring 276. In this way, the flash unit body 271 is projected out of the camera body to its flashing position (as shown in FIG. 16).

When a hook portion 271d projecting from the bottom of the flash unit body 271 abuts a fixed projection H3 in the camera body, the drive motor 101 stops rotating, and the camera is now ready to photograph.

Since the nut 39 is now at the position shown in FIG. 16, the lock portion 39a of the nut 39 is completely clear of the lower end 279c of the lever member 279.

When the main power is turned off on the camera in the state shown in FIG. 16, the drive motor 101 works to rotate the screw portion 38b in a predetermined direction. The nut 39 moves in the direction of the arrow Z2 as shown in FIG. 16, pressing the lower end 279c of the lever member 279 against the urging of the 280. The lever member 279 thus pivots clockwise.

As the lever member 279 pivots, the lift lever 278, under the urging of the spring 276, pivots counterclockwise about the shaft 274, with the shaft 278b abutting the top end 279d of the lever member 279 and the shaft 278c abutting the external wall 271c on the bottom side of the flash unit body 271. The flash unit body 271 is thus retracted into the camera body as shown in FIG. 15, and then the drive motor 101 stops working.

The force of the spring 280 for urging the flash unit body 271 to its flashing position is set to be greater than the force of the spring 276 for urging the flash unit body 271 into its retracted position.

Figure 17:
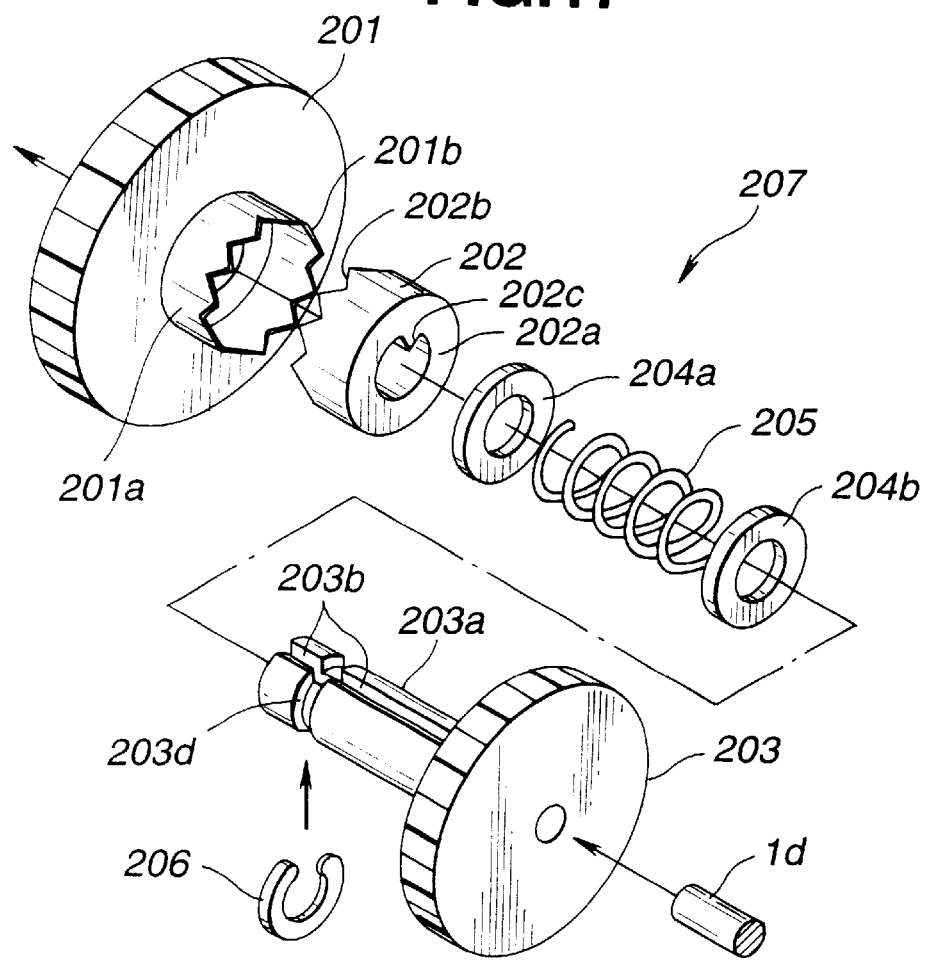
FIG. 17 is an exploded perspective view of a clutch mechanism in the camera of the second embodiment.

Referring to an exploded perspective view in FIG. 17, the construction of the clutch mechanism 207 is discussed.

The spur gear 201 has a cylinder portion 201a, one axial end of which is terminated in a plurality of sawteeth 201b. The spur gear 201 is rotatably coupled with a shaft 203a of the spur gear 203.

As the spur gear 201 has the sawteeth 201b, a clutch member 202 is terminated in sawteeth 202b. The clutch member 202 is restrained in rotation by the shaft 203a, but supported slidably in the direction of thrust by the shaft 203a. The sawteeth 202b and the sawteeth 201b of the spur gear 201 are designed to be engaged with each other.

To perform the clutch function, the shaft 203a of the spur gear 203 has a groove 203b that is V-shaped in cross section perpendicular to the axis and extends in the direction of thrust. The clutch member 202 has a hole 202a that matches the shaft 203a, with a V-shaped projection 202c that is fitted into the groove 203b.

Each of washers 204a and 204b has a round hole in the center, and is allowed to move in the direction of thrust along the shaft 203a. A clutch spring 205 is assembled between the washers 204a and 204b with a predetermined bias applied as in an engaged state shown in FIG. 18A.

An E-ring 206 is seated in a circular groove 203d on the end of the shaft 203a, and prevents the washer 204a, clutch member 202, and spur gear 201 from coming off the shaft 203a under the urging of the clutch spring 205.

Figure 18A:
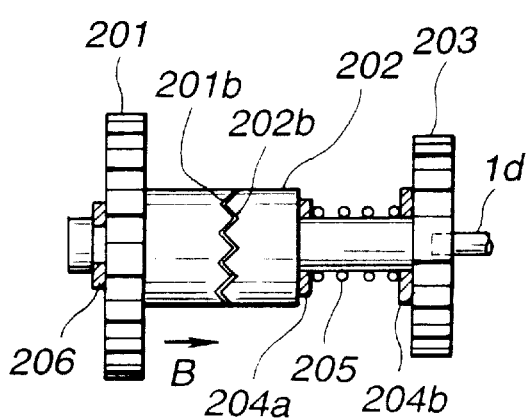
FIG. 18A is a side view showing the engagement of the clutch mechanism in the camera of the second embodiment.

The sawteeth 201b of the spur gear 201 are normally engaged with the sawteeth 202b of the clutch member 202 in the clutch mechanism 207 as shown in FIG. 18A. When the spur gear 201 is driven, its rotary motion is transferred to the clutch member 202.

The spur gear 203 is rotatably supported on the shaft 1d on the spool chamber unit 1. The clutch member 202 is engaged with the shaft 203a of the spur gear 203 with the projection 202c fitted into the groove 203b. When the clutch member 202 rotates, the spur gear 203 rotates integrally therewith. The drive power is transferred through the clutch mechanism 207 as described above.

Since the spur gear 201 and the clutch member 202 are engaged with each other with their sawteeth 201b and sawteeth 202b mated, a thrust force naturally takes place in the axial direction in the transfer of the rotary drive force. As shown in FIG. 18A, a thrust force takes place in the clutch member 202 in the direction of an arrow B. To counter the thrust force, the clutch spring 205 is assembled with a predetermined bias charged, in order to press the clutch member 202 in the direction opposite to the direction of the arrow B in FIG. 18A.

When the urging of the clutch spring 205 acting on the clutch member 202 is greater than the thrust force taking place in the transfer of the rotary drive power from the spur gear 201 to the clutch member 202, the drive power is transferred as described above.

Figure 18B:
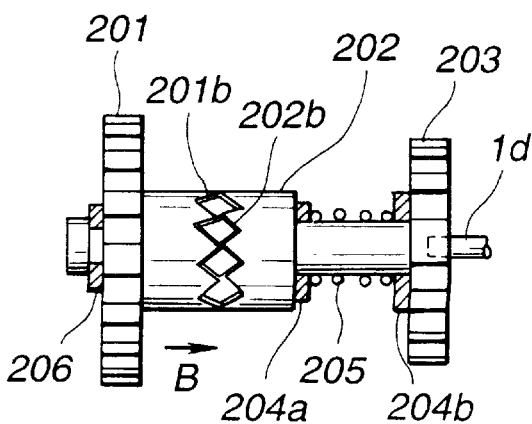
FIG. 18B is a side view showing the disengagement of the clutch mechanism in the camera of the second embodiment.

However, when the urging of the clutch spring 205 acting on the clutch member 202 is smaller than the thrust force taking place in the transfer of the rotary drive power from the spur gear 201 to the clutch member 202, the clutch member 202 moves in the direction of the arrow B against the urging of the clutch spring 205 as shown in a disengaged state in FIG. 18B. The sawteeth 201b of the spur gear 201 are disengaged from the sawteeth 202b of the clutch member 202, and the rotary drive power of the spur gear 201 is not transferred to the clutch member 202.

Specifically, when the drive torque for driving the spur gear 203 is greater than a threshold (hereinafter referred to as clutch threshold torque) below which the clutch mechanism 207 does not operate, or when the spur gear 203 is in a locked state, the spur gear 201 cannot transfer its drive power to the spur gear 203.

In the flash unit 7 of the present invention, the force of the clutch spring 205 is set such that the clutch threshold torque of the clutch mechanism 207 is greater than the drive torque for driving the flash unit body 271 with a predetermined margin. In the normal operating conditions of the camera, the clutch mechanism 207 remains inoperative, and the flash unit body 271 is driven.

If an attempt is made to drive the nut 39 further in the direction opposite to the direction of the arrow Z1 with the nut 39 already engaged with the flat portion 38g of the screw portion 38 as shown in FIG. 15, the nut 39 is mechanically blocked and cannot be driven any more. The clutch mechanism 207 is activated, releasing the clutch member 202 out of engagement, and the spur gear 203 mechanically linked to the nut 39 is not driven.

Specifically, if the spur gear 201 is driven to drive the nut 39 further in the direction opposite to the direction of the arrow Z1 with the nut 39 already engaged with the flat portion 38g of the screw portion 38 as shown in FIG. 15, the clutch mechanism 207 is activated, keeping the spur gear 203 unrotated.

Conversely, if the spur gear 201 is driven to drive the nut 39 further with the nut 39 already engaged with the flat portion 1f of the spool chamber unit 1, the clutch mechanism 207 is activated, keeping the spur gear 203 unrotated.

When the power of the camera is switched off by an unshown camera switch mechanism in this embodiment, the lens barrel unit 5 is retracted in its photograph-disable position with the flash unit body 271 put into its retracted position.

When the unshown camera switch mechanism turns on the power to the camera, the lens barrel unit 5 is driven to its photograph-enable position with the flash unit body 271 projecting out of the camera body to its flashing position.

To achieve the above function of the camera, relative drive phases that respectively determine the distances of travel of the lens barrel unit 5 and flash unit body 271 need to be continuously aligned.

When the lens barrel unit 5 is put in its photograph-enable position while the flash unit body 271 is out of phase with the lens barrel, for example, the flash unit body 271 remains in its retracted position, the clutch mechanism is activated to automatically correct the above phase mismatch.

More particularly, if the lens barrel unit 5 is driven into the photograph-disable position in the above state, the nut 39 abuts the flat portion 39g of the spur gear portion 38a of the feed screw 38, and the clutch mechanism 207 is activated, releasing the clutch mechanism 207 out of engagement.

The clutch mechanism 207 continuously operates until the lens barrel unit 5 is housed in its photograph-disable position, while the flash unit body 271 remains in the retracted position.

When the lens barrel unit 5 is put into the photograph-disable position with the flash unit body 271 remaining in the retracted position, both the lens barrel unit 5 and the flash unit body 271 are matched in phase.

Conversely, the lens barrel unit 5 may be in the photograph-disable position while the flash unit body 271 may project out of the camera body to its flashing position. In this case, the lens barrel unit 5 is driven to the photograph-enable position.

During the driving, the clutch mechanism 207 is activated, releasing the clutch member 202. The lens barrel unit 5 is moved to the photograph-enable position with the flash unit body 271 hold in its flashing position. This action makes both the lens barrel unit 5 and the flash unit body 271 match in phase.

In this way, even if the lens barrel unit 5 shifts from the flash unit body 271 in phase, the clutch mechanism 207 makes both match in relative phase.

According to the camera of this embodiment, the use of the clutch mechanism in the drive system for driving the flash unit body eliminates the need for phase matching in the drive positions of the lens barrel unit and the flash unit body. In their assembled state, once the lens barrel unit is driven from its photograph-disable position to its photograph-enable position or vice versa, both the lens barrel unit and the flash unit body are matched in phase. Although the number of manufacturing steps remains unchanged, the assembly is simplified. Faulty products due to assembly errors are reduced.

While the user uses the camera, any load may be exerted on the lens barrel unit, possibly causing a gear tooth slip (a slip in the meshed positions), and thereby shifting both the lens barrel unit and the flash unit body out of phase. In such a case, once the lens barrel unit is driven, the lens barrel unit and the flash unit body are correctly aligned, and thereafter the camera is ready to photograph.

The camera of this embodiment employs a tooth clutch as a clutch mechanism. 1f a friction clutch is used instead, as in the first embodiment of the present invention, the camera presents the same advantage.

A tooth clutch, more suitable for a relatively high load than a friction clutch, is employed, considering that the flash unit body is a relatively high load in the camera of this embodiment. The camera provides the same advantage if the tooth clutch is substituted for the friction clutch in the first embodiment.

The clutch mechanism of the camera of this embodiment makes the retracted position and projected position of the flash unit body respectively correspond to the photograph-disable position and the photograph-enable position of the lens barrel unit. The present invention may be applied to zoom flash drive means, in which the flash beam angle is varied in step with the focal length of the image lens. The focal length of the imaging lens and zoom flash unit are thus matched in phase.

Although the present invention has been described in relation to particular embodiments thereof, many other variations and modifications and other uses will become apparent to those skilled in the art. Therefore, the present invention is to be limited not by the specific disclosure herein, but only by the appended claims.

What is claimed is:

1. A camera comprising:
   a zoom lens barrel including a zoom imaging optical system;
   a finder optical system having a plurality of lenses;
   a drive source for generating a driver power;
   a deceleration mechanism for decelerating the drive power from said drive source by a predetermined amount;
   first drive power transfer mechanism for transferring the drive power decelerated by said deceleration mechanism to the zoom lens barrel;
   finder drive mechanism for driving the lenses of the finder optical system for movement relative to one another in said camera;
   second drive power transfer mechanism including a clutch, for transferring the drive power decelerated by said deceleration mechanism to the finder drive mechanism via the clutch; and
   a restraint which restrains the travel of the lenses of the finder optical system at predetermined positions.

2. A camera according to claim 1, wherein the clutch is a friction clutch.

3. A camera according to claim 2, wherein the friction clutch comprises a gear portion that is rotated by the drive power from the drive source and a clutch plate that abuts the gear portion with a predetermined friction force.

4. A camera according to claim 3, wherein the finder drive mechanism and the gear portion rotate integrally when a rotary load torque of the finder drive mechanism is equal to or smaller than a predetermined torque.

5. A camera according to claim 3, wherein the gear portion slips over the clutch plate with the finder drive remaining unrotated when a rotary load torque of the finder drive is greater than a predetermined torque.

6. A camera according to claim 3, wherein the gear portion is a helical gear.

7. A camera according to claim 1, wherein the gear portion slips over the clutch plate with the finder drive mechanism remaining unrotated when the stopper restrains the travel of the finder drive.

8. A camera according to claim 1, wherein the focal length of the zoom imaging optical system is varied by the drive power from the drive source.

9. A camera according to claim 1, wherein the angle of field of the view finder optical system is varied by the drive power from the drive source.

10. A camera comprising:
    a zoom lens barrel including a zoom imaging optical system;
    a finder optical system having a plurality of lenses;
    a drive source for generating a drive power;

a deceleration gear train for decelerating the drive power from said drive source by a predetermined amount;

a lens barrel drive gear train for transferring said drive power decelerated by said deceleration gear train to the zoom lens barrel;

a finder cam for driving the lenses of the finder optical system for movement relative to one another in said camera;

a finder drive gear train, including a friction clutch mechanism, for transferring the drive power decelerated by said deceleration gear train to the finder cam via the friction clutch mechanism; and a restraint which restrains the travel of the lenses of the finder optical system relative to one another at predetermined positions.

11. A camera according to claim 10, wherein the friction clutch mechanism comprises, a gear portion that is rotated by the drive power from the drive source and a clutch plate that abuts the gear portion with a predetermined friction force.

12. A camera according to claim 10, wherein the finder cam and the gear portion rotate integrally when a rotary load torque of the finder cam is equal to or smaller than a predetermined torque.

13. A camera according to claim 10, wherein the gear portion slips over the clutch plate with the finder cam remaining unrotated when a rotary load torque of the finder cam is greater than a predetermined torque.

14. A camera according to claim 10, wherein the restraint comprises:

a restraining portion for restraining travel of the finder cam; and an abutting portion which the finder cam is provided with and which abuts the restraining portion at a predetermined position of the travel of the finder cam.

15. A camera according to claim 14, wherein the gear portion slips over the clutch plate with the finder cam remaining unrotated when the abutting portion abuts the restraining portion.

16. A drive mechanism for use in a camera, comprising:

a lens barrel that is retracted and projected in the direction of an optical axis;

a movable member that moves in response to the position of the lens barrel;

a drive source for driving the lens barrel and the movable member;

a drive power transfer mechanism for transferring a drive power from the drive source to a predetermined position;

a lens barrel drive power transfer mechanism for transferring the drive power from the drive power transfer mechanism to the lens barrel;

a movable member drive power transfer mechanism for transferring the drive power from the drive power transfer mechanism to the movable member;

a clutch arranged on the movable member drive power transfer mechanism; and a restraint which restrains the travel of the movable member at a predetermined position.

17. A drive mechanism according to claim 16, wherein the movable member is a finder optical system.

18. A drive mechanism according to claim 16, wherein the movable member is a pop-up flash unit.

19. A drive mechanism according to claim 16, wherein the movable member is a zoom flash unit.

20. A drive mechanism according to claim 16, wherein the clutch is an overload clutch.

21. A drive mechanism according to claim 20, wherein the overload clutch is a friction clutch.

22. A drive mechanism according to claim 20, wherein the overload clutch is a tooth clutch.

23. In a camera, a combination, comprising:

a zoom lens;

said zoom lens having a first focal length;

said first focal length is variable and is adjustable between a first telephoto position at which said first focal length is at a maximum and a first wide angle position at which said first focal length is at a minimum;

said zoom lens also including at least a first pair of moveable lenses which move relative to one another to adjust said first focal length;

a zoom viewfinder;

said zoom viewfinder having a second focal length;

said second focal length is adjustable between a second telephoto position at which said second focal length is at a maximum and a second wide angle position at which said second focal length is at a minimum;

said zoom viewfinder including at least a second pair of moveable lenses which move relative to one another to adjust said second focal length;

a source of motive force;

a transmission which applies said motive force to said zoom lens and said zoom viewfinder so that said first and second focal lengths are adjusted in unison during a focusing operation, but which permits one of said first and second focal lengths to be adjusted independently of an opposite one of said first and second focal lengths during an alignment operation.

24. The combination of claim 23, wherein during said alignment operation;

said first and second focal lengths may be adjusted independently of each other when one of said zoom lens and said zoom viewfinder reaches one of said first and second telephoto position or said first and second wide angle position before the other of said zoom lens and said zoom viewfinder reaches said first and second telephoto position or said first and second wide angle position.

25. The combination of claim 24, wherein said transmission permits said first focal length to be adjusted independently of said second focal length when said zoom viewfinder reaches said second telephoto position or said second wide angle position.

26. The combination of claim 25, wherein said transmission does not permit said second focal length to be adjusted independently of said first focal length after said zoom lens reaches said first telephoto position or said first wide angle position.

27. The combination of claim 23, wherein said transmission includes a clutch which permits one of said first and second focal lengths to be adjusted independently of an opposite one of said first and second focal lengths.

28. The combination of claim 27, wherein said clutch permits said second pair of movable lenses to stop moving even though motive force is still being supplied by said source of motive power.

29. The combination of claim 27, wherein said clutch is connected between said source of motive power and said zoom view finder.

30. The combination of claim 29, wherein said clutch is a friction clutch.

31. The combination of claim 23, wherein said source of motive power is a motor.

32. A process for adjusting the focal alignment of a zoom lens and a zoom viewfinder, said zoom lens having a first focal length which is variable between a first telephoto position at which said first focal length is at a maximum and a first wide angle position at which said first focal length is at a minimum, said zoom lens including at least a first pair of moveable lenses which move relative to one another, said zoom viewfinder having a second focal length which is adjustable between a second telephoto position at which said second focal length is at a maximum and a wide angle position at which said first focal length is at a minimum, said zoom viewfinder including at least a second pair of moveable lenses which move relative to one another, said first and second focal lengths are adjusted in unison during a focusing operation but, due to the presence of a clutch in the gear train applying power to at least one of said zoom lens and zoom viewfinder , may have at least one of said first and second focal lengths adjusted independently of one another during an alignment operation, said operation comprising the acts of:

moving said zoom lens into one of said first telephoto and wide-angle positions and, while said zoom lens is in said one of said first telephoto and wide-angle positions, moving said zoom viewfinder to a corresponding said second telephoto and wide-angle position.

33. The process of claim 32, wherein said one of said first telephoto and wide-angle positions is said first telephoto position.

34. The process of claim 32, wherein said one of said first telephoto and wide-angle positions is said first wide-angle position.

35. A process for adjusting an alignment of a focal length of a zoom lens and a zoom viewfinder respectively wherein said focal lengths adjusted in unison during a focusing operation but, due to the presence of a clutch in a gear train applying power to at least one of said zoom lens and zoom viewfinder, may be adjusted independently of one another, said zoom lens and said telephoto lenses each being movable between a telephoto position at which said focal lengths are at a maximum and a wide-angle position at which said focal lengths are at a minimum, said process comprising the acts of:

initially placing said zoom lens and said zoom viewfinder in a camera with said focal lengths of said zoom lens and said zoom viewfinder being out of phase with each other, moving said zoom lens into one of said telephoto and wide-angle positions and, while said zoom lens is in said position, and moving said zoom viewfinder into a corresponding said telephoto or wide-angle position so as to bring said zoom lens and zoom viewfinder in phase with each other.

36. A drive mechanism for use in a camera, comprising:

a lens barrel that is retracted and projected along an optical axis;

a movable member that moves in response to a movement of said lens barrel;

a drive source for driving the lens barrel and the movable member;

a speed mechanism for reducing the drive power from the drive source by a predetermined amount;

a first drive power transfer mechanism for transferring the drive power reduced by the speed-reduction mechanism to the lens barrel;

second drive power transfer mechanism, including clutch mechanism, for transferring the drive power reduced by the speed-reduction mechanism to the movable member; and a restraining mechanism restrains the travel of the movable member at a predetermined position.

37. A drive mechanism for use in a camera according to claim 36, wherein the movable member is a finder optical system.

38. A drive mechanism for use in a camera according to claim 36, wherein the movable member is a pop-up flash unit.

39. A drive mechanism for use in a camera according to claim 36, wherein the movable member is a zoom flash unit.

* * * * *